United States Patent
Greiner et al.

(10) Patent No.: US 7,286,732 B2
(45) Date of Patent: Oct. 23, 2007

(54) DISTRIBUTED OPTICAL STRUCTURES DESIGNED BY COMPUTED INTERFERENCE BETWEEN SIMULATED OPTICAL SIGNALS

(75) Inventors: Christoph M. Greiner, Eugene, OR (US); Thomas W. Mossberg, Eugene, OR (US); Dmitri Iazikov, Springfield, OR (US)

(73) Assignee: LightSmyth Technologies Inc., Eugene, OR (US)

( * ) Notice: Subject to any disclaimer, the term of this patent is extended or adjusted under 35 U.S.C. 154(b) by 0 days.

(21) Appl. No.: 11/685,212

(22) Filed: Mar. 13, 2007

(65) Prior Publication Data

US 2007/0154144 A1   Jul. 5, 2007

Related U.S. Application Data

(63) Continuation of application No. 11/532,532, filed on Sep. 17, 2006, now Pat. No. 7,190,859, which is a continuation of application No. 11/055,559, filed on Feb. 9, 2005, now Pat. No. 7,123,794, and a continuation-in-part of application No. 10/989,236, filed on Nov. 15, 2004, now Pat. No. 6,965,716, which is a continuation-in-part of application No. 10/653,876, filed on Sep. 2, 2003, now Pat. No. 6,829,417, which is a continuation-in-part of application No. 10/229,444, filed on Aug. 27, 2002, now Pat. No. 6,678,429, and a continuation-in-part of application No. 10/602,327, filed on Jun. 23, 2003, now Pat. No. 6,859,318.

(60) Provisional application No. 60/550,393, filed on Mar. 5, 2004, provisional application No. 60/546,348, filed on Feb. 20, 2004, provisional application No. 60/543,454, filed on Feb. 9, 2004, provisional application No. 60/486,450, filed on Jul. 10, 2003, provisional application No. 60/468,479, filed on May 7, 2003, provisional application No. 60/370,182, filed on Apr. 4, 2002, provisional application No. 60/315,302, filed on Aug. 27, 2001, provisional application No. 60/247,231, filed on Nov. 10, 2000, provisional application No. 60/235,330, filed on Sep. 26, 2000, provisional application No. 60/199,790, filed on Apr. 26, 2000, provisional application No. 60/190,126, filed on Mar. 16, 2000.

(51) Int. Cl.
*G02B 6/34* (2006.01)
*G03H 1/10* (2006.01)
*H04J 14/02* (2006.01)

(52) U.S. Cl. .................... 385/37; 385/129; 359/10; 359/15; 359/34; 398/79; 398/84; 398/87

(58) Field of Classification Search ............... None
See application file for complete search history.

(56) References Cited

U.S. PATENT DOCUMENTS 4,740,951 A * 4/1988 Lizet et al. ............ 398/87

(Continued)

*Primary Examiner*—Tina M. Wong
(74) *Attorney, Agent, or Firm*—David S. Alavi

(57) ABSTRACT

An optical apparatus comprises a planar optical waveguide and at least one set of diffractive elements formed in or on the waveguide. The waveguide is arranged to confine propagating optical signals in at least one transverse dimension. The diffractive element set collectively exhibits a positional variation in diffractive amplitude, optical separation, or spatial phase over some portion of the set. The diffractive element set is collectively arranged to route, as an output optical signal, between corresponding input and output optical ports, a corresponding diffracted portion of an input optical signal. The diffractive element set is collectively arranged so that the input optical signal or the output optical signal is successively incident on the diffractive elements. The diffractive elements are arranged according to an interference pattern derived from computed interference between a simulated design input optical signal and a simulated design output optical signal, the interference pattern exhibiting said positional variation.

31 Claims, 23 Drawing Sheets

U.S. PATENT DOCUMENTS 6,243,514 B1 * 6/2001 Thompson .................... 385/37
6,553,162 B1 * 4/2003 Okayama ..................... 385/37
6,678,429 B2 * 1/2004 Mossberg et al. ............. 385/10
2005/0063430 A1 * 3/2005 Doucet et al. ................ 372/23

* cited by examiner

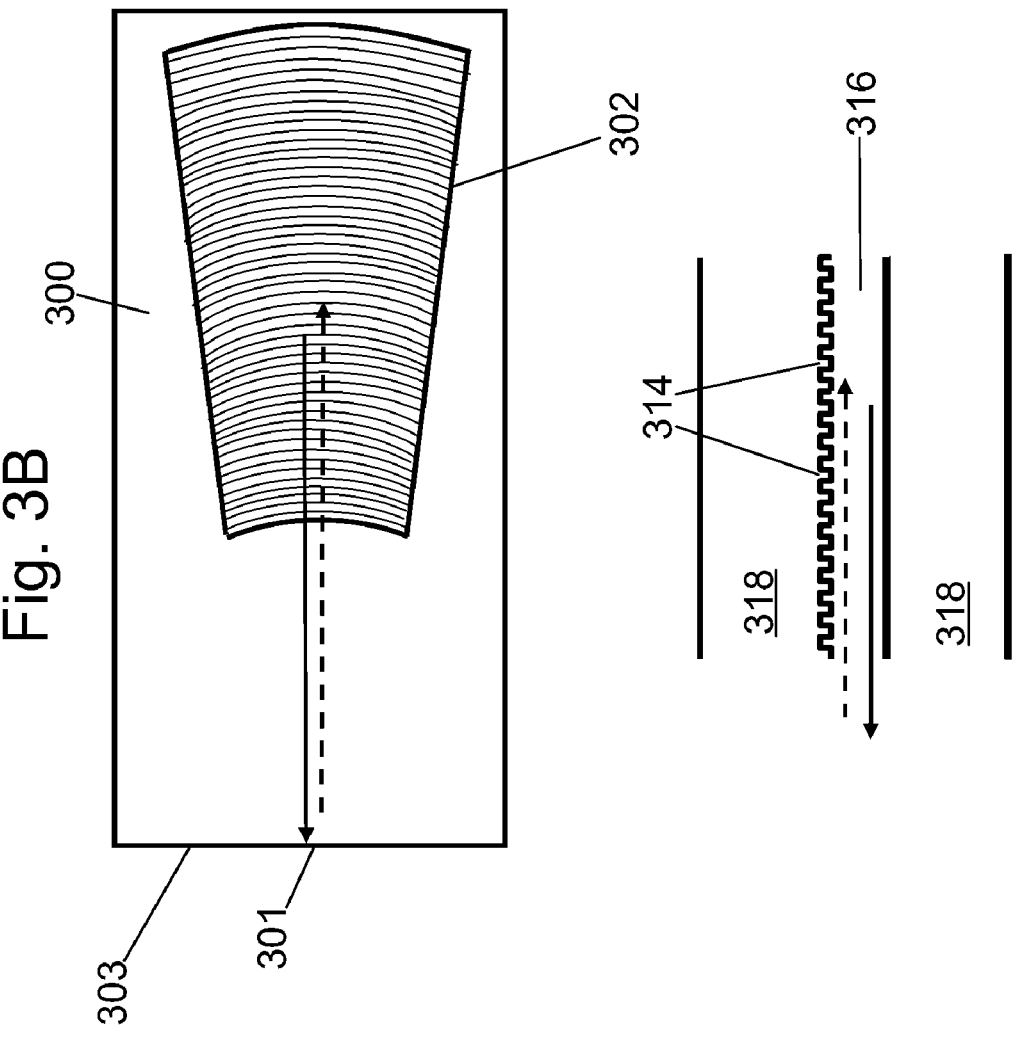
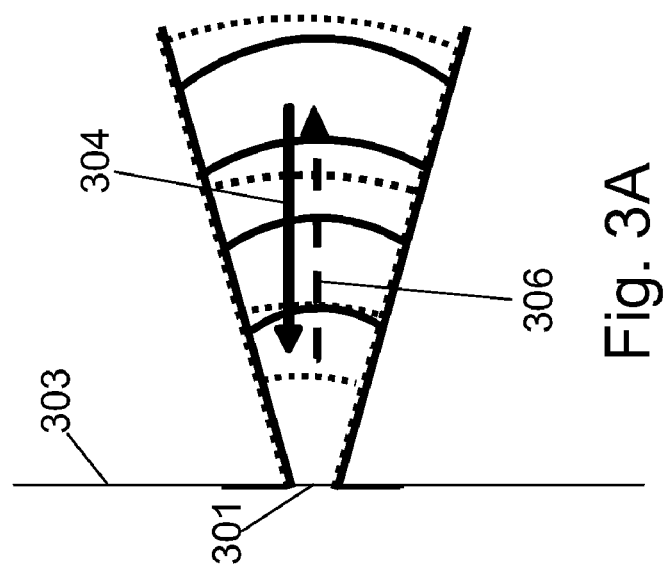

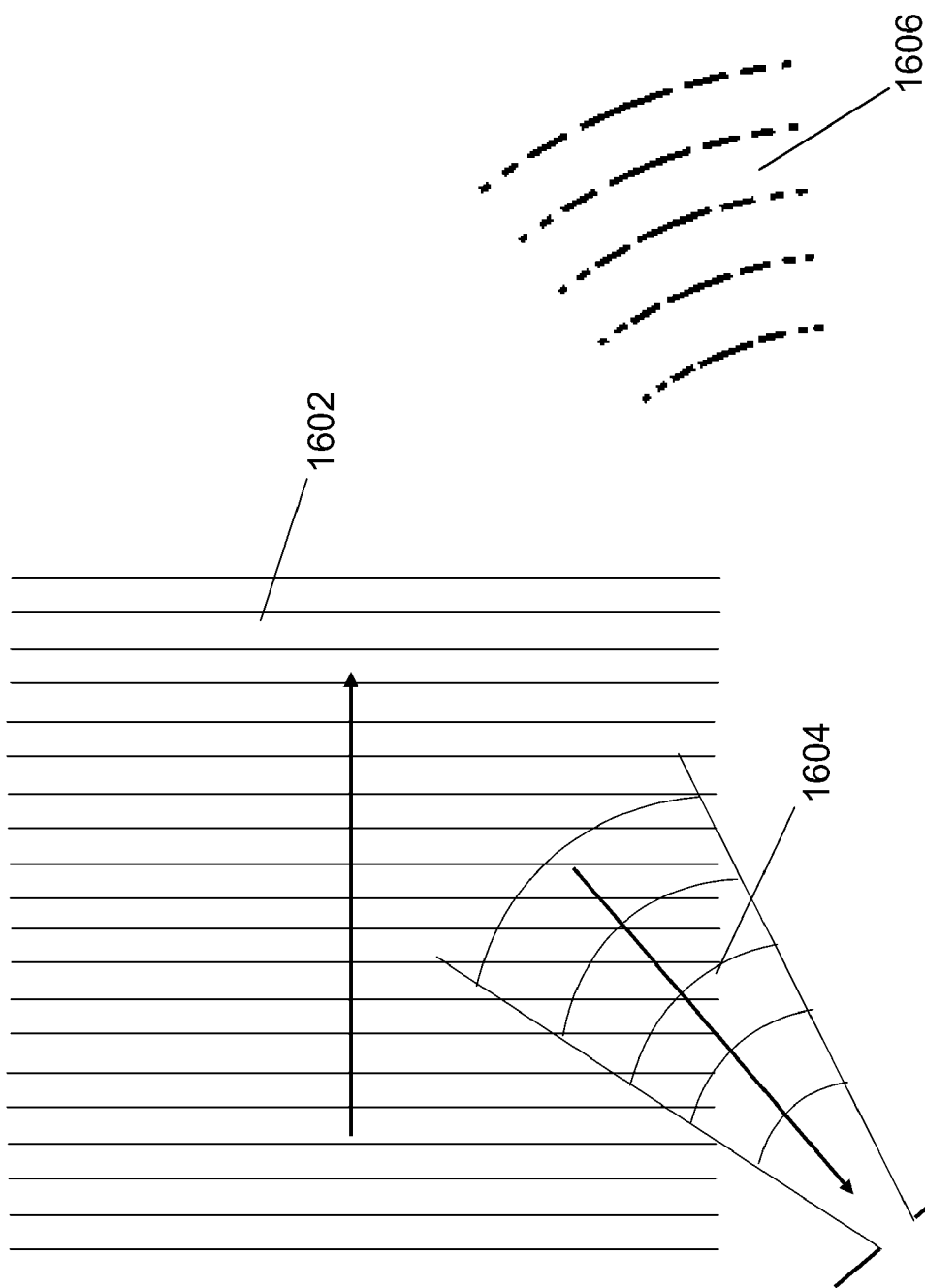

DISTRIBUTED OPTICAL STRUCTURES DESIGNED BY COMPUTED INTERFERENCE BETWEEN SIMULATED OPTICAL SIGNALS

BENEFIT CLAIMS TO RELATED APPLICATIONS

This application is a continuation of U.S. non-provisional application Ser. No. 11/532,532 filed Sep. 17, 2006 (now U.S. Pat. No. 7,190,859), which is in turn a continuation of U.S. non-provisional application Ser. No. 11/055,559 filed Feb. 9, 2005 (now U.S. Pat. No. 7,123,794), which in turn claims benefit of: (i) U.S. provisional App. No. 60/543,454 filed Feb. 9, 2004; (ii) U.S. provisional App. No. 60/546,348 filed Feb. 20, 2004; and (iii) U.S. provisional App. No. 60/550,393 filed Mar. 5, 2004. Each of said application Ser. Nos. 11/532,532, 11/055,559, 60/543,454, 60/546,348, and 60/550,393 is hereby incorporated by reference as if fully set forth herein.

Said application Ser. No. 11/055,559 is also a continuation-in-part of U.S. non-provisional application Ser. No. 10/989,236 filed Nov. 15, 2004 (now U.S. Pat. No. 6,965,716), which is in turn a continuation-in-part of U.S. non-provisional application Ser. No. 10/653,876 filed Sep. 2, 2003 (now U.S. Pat. No. 6,829,417), which is in turn a continuation-in-part of U.S. non-provisional application Ser. No. 10/229,444 filed Aug. 27, 2002 (now U.S. Pat. No. 6,678,429), which in turn claims benefit of: (i) U.S. provisional App. No. 60/315,302 filed Aug. 27, 2001; and (ii) U.S. provisional App. No. 60/370,182 filed Apr. 4, 2002. Application Ser. No. 10/653,876 also claims benefit of (i) U.S. provisional App. No. 60/468,479 filed May 7, 2003; and (ii) U.S. provisional App. No. 60/486,450 filed Jul. 10, 2003. Each of said application Ser. Nos. 10/989,236, 10/653,876, 10/229,444, 60/468,479, 60/486,450, 60/315,302, and 60/370,182 are hereby incorporated by reference as if fully set forth herein.

Said application Ser. No. 11/055,559 is also a continuation-in-part of U.S. non-provisional application Ser. No. 10/602,327 filed Jun. 23, 2003 (now U.S. Pat. No. 6,859,318), and also a continuation-in-part of U.S. non-provisional application Ser. No. 09/811,081 filed Mar. 16, 2001 (now U.S. Pat. No. 6,879,441), which in turn claims benefit of: (i) U.S. provisional App. No. 60/190,126 filed Mar. 16, 2000; (ii) U.S. provisional App. No. 60/199,790 filed Apr. 26, 2000; (iii) U.S. provisional App. No. 60/235,330 filed Sep. 26, 2000; and (iv) U.S. provisional App. No. 60/247,231 filed Nov. 10, 2000. Each of said application Ser. Nos. 10/602,327, 09/811,081, 60/190,126, 60/199,790, 60/235,330, and 60/247,231 is hereby incorporated by reference as if fully set forth herein.

BACKGROUND

The field of the present invention relates to optical devices incorporating distributed optical structures. In particular, distributed optical structures in planar waveguides and coupling in-plane and out-of-plane optical signals are disclosed herein.

One or more distributed optical structures (i.e., sets of diffractive elements) in a channel waveguide, an optical fiber, a slab waveguide, or another guided-wave optical structure may be used in a variety of devices for spectral filtering, laser frequency control, spectral multiplexing, optical sensing, or other functions. It is often desirable that such devices be optimized, or nearly so, for routing, mapping, or coupling optical signals between input and output optical ports with minimal optical loss. Distributed optical structures designed by computed interference between simulated optical signals are disclosed herein that may enable such optimized routing, coupling, or mapping.

Various embodiments, implementations, and adaptations of such diffractive element sets are disclosed in: application Ser. No. 11/021,549 filed Dec. 23, 2004; application Ser. No. 10/998,185 filed Nov. 26, 2004 (now U.S. Pat. No. 6,993,223); application Ser. No. 10/898,527 filed Jul. 22, 2004 (now U.S. Pat. No. 7,194,164); application Ser. No. 10/989,244 filed Nov. 15, 2004 (now U.S. Pat. No. 6,961,491); application Ser. No. 10/798,089 filed Mar. 10, 2004 (now U.S. Pat. No. 6,823,115); and application Ser. No. 09/843,597 filed Apr. 26, 2001 (now U.S. Pat. No. 6,965,464). Each of said applications is hereby incorporated by reference as if fully set forth herein. A publication entitled "Planar holographic optical processing devices" (T. W. Mossberg, Opt. Lett. 26 414 (2001)) is also incorporated by reference as if fully set forth herein.

SUMMARY

An optical apparatus comprises a planar optical waveguide and at least one set of diffractive elements formed in or on the waveguide. The planar optical waveguide is arranged so as to substantially confine in at least one transverse spatial dimension optical signals propagating therein. The diffractive element set is collectively arranged in or on the planar optical waveguide so as to exhibit a positional variation in diffractive amplitude, optical separation, or spatial phase over some portion of the set. The diffractive element set is collectively arranged in or on the planar optical waveguide so as to route, as an output optical signal, between corresponding input and output optical ports, a corresponding diffracted portion of an input optical signal that is diffracted by the diffractive element set. The diffractive element set is collectively arranged in or on the planar optical waveguide so that the input optical signal or the output optical signal is successively incident on the diffractive elements of the set. The diffractive elements of the set are arranged in or on the planar optical waveguide according to an interference pattern derived from computed interference between a simulated design input optical signal and a simulated design output optical signal, the interference pattern exhibiting said positional variation.

Objects and advantages pertaining to diffractive element sets in planar waveguides may become apparent upon referring to the disclosed exemplary embodiments as illustrated in the drawings and disclosed in the following written description and/or claims.

BRIEF DESCRIPTION OF THE DRAWINGS

FIG. 3A illustrates schematically simulated design input and output optical beams. FIGS. 3B and 3C are schematic top and cross-sectional views of the diffractive element set based on an interferogram resulting from the simulated optical beams of FIG. 3A.

FIGS. 14A and 14B illustrate schematically a cross-section of an electrical circuit with a photonic transport layer, while FIG. 4E schematically illustrates fabrication of such elements.

FIG. 16A illustrates schematically simulated design input and output optical signal beams. FIG. 16B illustrates schematically the resulting interference pattern.

Figure 1:
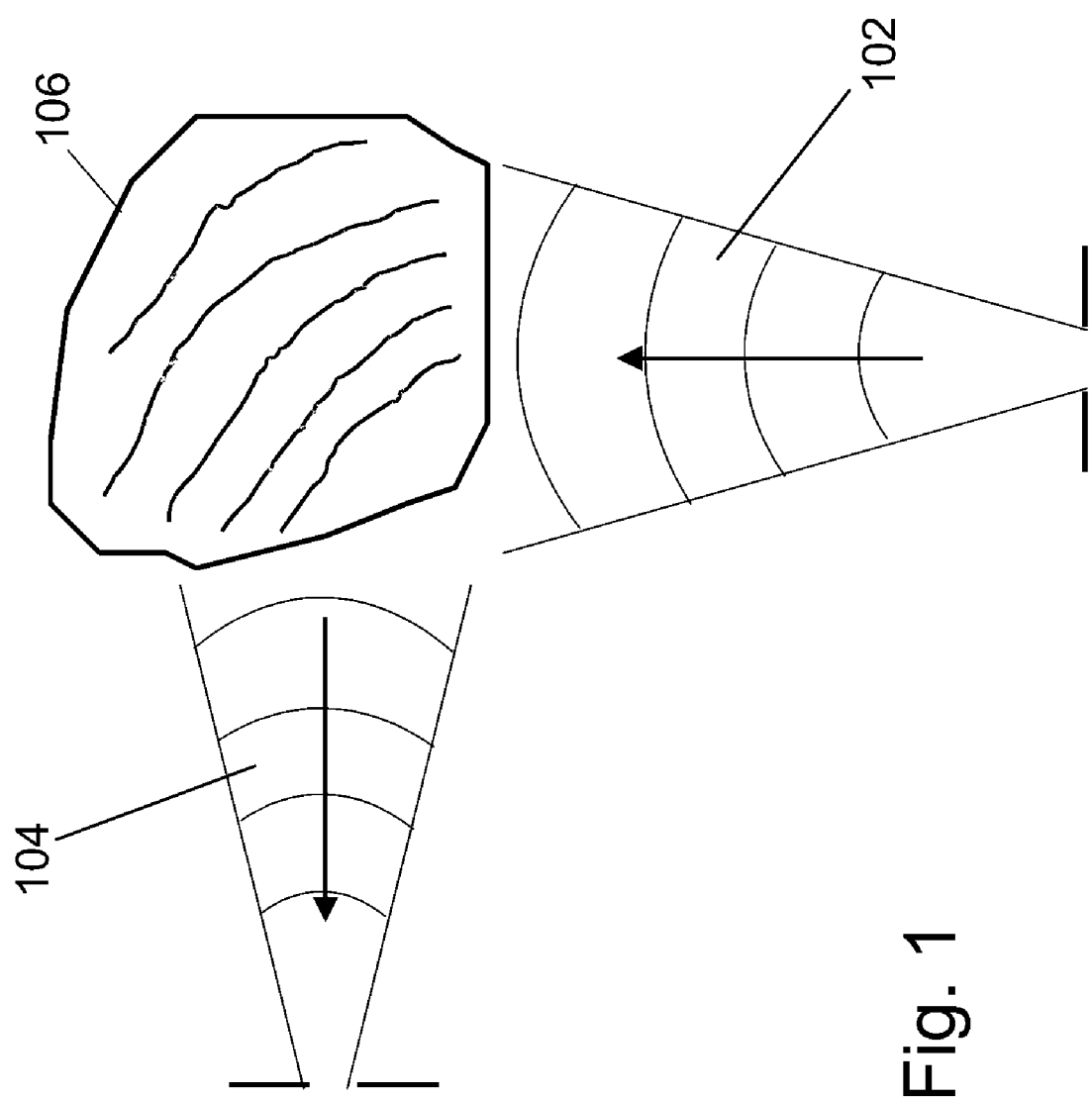
FIG. 1 illustrates schematically simulated design input and output optical signal beams and the resulting interference pattern.

In the FIGS., typically only a few diffractive elements are shown out of an entire diffractive element set, which may contain anywhere from a few, dozens, hundreds, or even thousands of diffractive elements. The FIGS. may illustrate the waveguide or diffractive elements schematically, and therefore may not show all structures in their proper shape or proportions. The lines or curves representing the diffractive elements, or the contours defining them, do not necessarily represent their actual shapes. In particular, straight lines in some of the FIGS. may in fact represent elements or contours that may be curved in actual devices, and vice versa. In many of the Figures, an optical waveguide and the diffractive elements thereof are shown in cross section. Unless specifically stated otherwise, such cross-sectional FIGS. may represent both channel and slab waveguides, as well as other guided-wave optical structures. The local direction of optical propagation (i.e., the longitudinal dimension) is substantially horizontal (with respect to both the orientation of such cross-sectional FIGS. as well as a substantially horizontal planar waveguide substrate, which may be present but might not be shown in the Figures). Two transverse dimensions are defined locally as perpendicular to the local longitudinal dimension. For both channel and slab waveguides the supported optical modes are substantially confined in the vertical transverse dimension of the cross-sectional FIGS. (vertical with respect to both the orientation of the Figure as well as a substantially horizontal planar waveguide substrate, if present). The horizontal transverse dimension is substantially normal to the plane of such cross-sectional Figures, and substantially parallel to a planar waveguide substrate (if present); a slab waveguide permits optical signal propagation in said horizontal transverse dimension, while a channel optical waveguide substantially confines the optical signal in the horizontal transverse dimension.

It should be noted that while many of the exemplary embodiments shown or described herein have a diverging input beam mapped into a converging output beam, the present disclosure or appended claims also encompass embodiments in which input and output beams may include any desired combination of converging, diverging, or substantially collimated beams.

It should be noted that many of the FIGS. depict simulated design input and output generating fields and the resulting design interferogram. However, many of these FIGS. may also be viewed as depicting a simulated input probe field, a simulated diffractive element set modeled according to the design interferogram, and a calculated output field, or instead as depicting actual, physical device input and output signals and the actual, physical diffractive element set fabricated according to the design interferogram.

The embodiments shown in the FIGS. are exemplary, and should not be construed as limiting the scope of the present disclosure or appended claims.

DETAILED DESCRIPTION OF EMBODIMENTS

An optical apparatus according to the present disclosure comprises an optical element having at least one set of diffractive elements. The optical element may comprise a planar optical waveguide substantially confining in at least one transverse spatial dimension optical signals propagating therein. A planar optical waveguide is generally formed on or from a substantially planar substrate of some sort, which may be substantially flat or may be somewhat curved, bent, or deformed. The confined optical signals typically propagate as transverse optical modes supported or guided by the planar waveguide. These optical modes are particular solutions of the electromagnetic field equations in the space occupied by the waveguide. The planar waveguide may comprise a slab waveguide (substantially confining in one transverse dimension an optical signal propagating in two dimensions therein), or may comprise a channel waveguide (substantially confining in two transverse dimension an optical signal propagating in one dimension therein). It should be noted that the term "planar waveguide" is not used consistently in the literature; for the purposes of the present disclosure and/or appended claims, the term "planar waveguide" is intended to encompass both slab and channel waveguides. More generally, the adaptations disclosed or claimed herein may be implemented in any guided-wave optical structure, including grating-like structures. The disclosed adaptations may be applied to channel, slab, rib, fiber, and other guided-wave optical structures known in the art. In the present disclosure, planar waveguides are specifically referred to for concreteness only, and the various exemplary embodiments described herein may be implemented in other guided-wave optical structures as well.

The planar waveguide typically comprises a core surrounded by lower-index cladding (often referred to as upper and lower cladding, or first and second cladding; these may or may not comprise the same materials). The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) The indices $n_1$, $n_2$, or $n_{core}$ may be spatially substantially uniform over the planar waveguide, or may spatially vary over the extent of the planar waveguide, as set forth hereinbelow. The core or cladding(s) may comprise multiple materials having different indices. A planar waveguide may support one or more transverse modes, depending on the dimensions and refractive indices of the core and cladding. A wide range of material types may be employed for fabricating a planar waveguide, including but not limited to glasses, polymers, plastics, semiconductors, combinations thereof, and/or functional equivalents thereof. The planar waveguide may be secured to a substrate for facilitating manufacture, for mechanical support, and/or for other reasons. A planar waveguide typically supports or guides one or more optical modes characterized by their respective amplitude variations along the confined dimension.

The set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a holographic optical processor (HOP); a programmed holographic structure (PHS); a directional photonic-bandgap structure; a mode-selective photonic crystal; or other equivalent terms of art. Each diffractive element of the set may comprise one or more diffracting regions thereof that diffract, reflect, scatter, route, or otherwise redirect portions of an incident optical signal (said process hereinafter simply referred to as diffraction). For a planar waveguide, the diffracting regions of each diffractive element of the set typically comprises some suitable alteration of the planar waveguide (ridge, groove, index modulation, density modulation, and so on), and is spatially defined with respect to a virtual one-or two-dimensional linear or curvilinear diffractive element contour, the curvilinear shape of the contour typically being configured to impart desired spatial characteristics onto the diffracted portion of the optical signal. It should be noted that the terms "diffractive contour" and "diffractive element" are sometimes used interchangeably in the present disclosure. Implementation of a diffractive element with respect to its virtual contour may be achieved in a variety of ways, including those disclosed in the references cited herein. Each linear or curvilinear diffractive element is shaped to direct its diffracted portion of the optical signal to an output optical port. The relative spatial arrangement (e.g. longitudinal spacing) of the diffractive elements of the set, and the relative amplitude diffracted from each diffractive element of the set, yield desired spectral and/or temporal characteristics for the overall diffracted optical signal routed between the corresponding input and output optical ports. It should be noted that an optical port (input and/or output) may be defined structurally (for example, by an aperture, waveguide, fiber, lens, or other optical component) and/or functionally (for example, by a spatial location, convergence/divergence/collimation, and/or propagation direction). For a single-mode planar waveguide, such a set of diffractive elements may be arranged to yield an arbitrary spectral/temporal transfer function (in terms of amplitude and phase). In a multimode planar waveguide, modal dispersion and mode-to-mode coupling of diffracted portions of the optical signal may limit the range of spectral/temporal transfer functions that may be implemented.

The diffractive elements of the set (or equivalently, their corresponding contours) are spatially arranged with respect to one another so that the corresponding portions of the optical signal diffracted by each element interfere with one another at the output optical port, so as to impart desired spectral and/or temporal characteristics onto the portion of the optical signal collectively diffracted from the set of diffractive elements and routed between the input and output optical ports. The diffractive elements in the set are arranged so that an input optical signal, entering the planar waveguide through an input optical port, is successively incident on diffractive elements of the set. For the purposes of the present disclosure and/or appended claims, "successively incident" shall denote a situation wherein a wavevector at a given point on the wavefront of an optical signal (i.e., a wavefront-normal vector; sometimes referred to as a "portion" of the spatial wavefront) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal (even at high angles-of-incidence), and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

As set forth in prior-filed co-pending application Ser. No. 10/998,185 (cited hereinabove), diffracting regions of a diffractive element set may be distributed over one or more spatial regions of the optical element, for facilitating placement of multiple diffractive element sets in a single optical element. These spatial regions may be positioned and arranged so as to impart desired spatial, spectral, or temporal characteristics onto the corresponding routed portions of an incident optical signal. Such arrangement may include an optical signal being successively incident on multiple spatial regions of a diffractive element set, with "successively incident" defined as set forth hereinabove. The word "primitive" may be used to designate one diffractive element set among multiple diffractive element sets in a single optical element (e.g., a single optical device may include multiple "primitive programmed holographic structures").

A given set of diffractive elements provides dual functionality, spatially routing a diffracted portion of an optical signal between an input optical port and an output optical port, while at the same time acting to impart a spectral/temporal transfer function onto the diffracted portion of an input optical signal to yield an output optical signal. The diffractive elements may be designed (by computer generation, for example, which is a primary topic of the present disclosure) so as to provide optimal routing, imaging, or focusing of the optical signal between an input optical port and a desired output optical port, thus reducing or minimizing insertion loss (at least with respect to contour shape). Simple linear or curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references cited herein. The following are exemplary only, and are not intended to be exhaustive. The teachings of the present disclosure pertaining to design of diffractive element sets may be implemented regardless of the method(s) employed for forming the planar waveguide or diffractive element set(s) thereof. The teachings of the present disclosure enable the design of a wide range of diffractive element sets providing for general wavefront and directional transformations between input and output beams.

Diffractive elements may be formed lithographically on the surface of a planar optical waveguide, or at one or both interfaces between core and cladding of a planar optical waveguide. Diffractive elements may be formed lithographically in the interior of the core layer and/or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask onto the surface of the planar waveguide (referred to herein as external photoexposure) so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter (described further hereinbelow). The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. Essentially, each diffractive element contour may be optimized to image the input port onto the output port in a phase coherent manner. Inputs to the design are the detailed structure of the input and output optical ports and their locations. Standard ray tracing approaches to optical element design may provide a diffractive contour at each optical distance into the planar waveguide that will provide an optimal imaging of the input signal at the input port onto the optimal output signal at the output port. Simple curves (e.g. conic sections) may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between diffracted components at the output port, and/or the diffractive strength of the elements may be individually controlled as well (as described in detail in the references cited hereinabove).

An alternative approach to designing the diffractive element contours for a diffractive element set, and a primary topic of the present disclosure, is to calculate interference patterns between simulated fields at a desired wavelength and with desired spectra and/or waveforms entering the input port and exiting the output port. In forming or writing a summed pattern for the diffractive element set, suitable discretization is applied as needed for any lithographic or UV exposure approach that is utilized for fabrication. The holographic structure may be designed by interference of computer-generated beams having the desired computer-generated temporal waveforms (explicitly time-dependent or continuous-wave), with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform. Various exemplary embodiments of such interferometric design of diffractive element sets are set forth hereinbelow and in the accompanying FIGS.

In an alternative method for making the diffractive element structure, the optical element may include material of appropriate index that is also photosensitive at the wavelength of the desired operational signal beams. As in traditional holography, the input and output recording beams (same wavelength as operational signal beams of the envisioned device) are overlapped as they propagate in the planar waveguide (referred to herein as internal photoexposure), thereby recording in the planar waveguide an interference pattern. Subsequently the photosensitive material is developed and, if necessary, a cladding may be deposited or attached by other means.

The phrase "operationally acceptable" appears herein describing levels of various performance parameters of planar waveguides and diffractive element sets thereof. Such parameters may include optical coupling coefficient (equivalently, optical coupling efficiency), diffraction efficiency, undesirable optical mode coupling, optical loss, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefore vary within a given class of devices depending on such constraints and/or requirements. For example, a lower optical coupling efficiency may be an acceptable trade-off for achieving lower device fabrication costs in some instances, while higher optical coupling may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "so as to substantially avoid undesirable optical coupling", and so on as used herein shall be construed in light of this notion of "operationally acceptable" performance.

In the present disclosure are disclosed methods for designing and fabricating diffractive element sets as well as a broad range of diffractive element set geometries. Diffractive element sets designed according to the disclosed methods may efficiently map or couple virtually any input optical wavefront into any desired output optical wavefront, whether the input and output signals propagate in the same, opposite, or in angled directions, whether the input and output ports or sources are spatially extended or point-like, or whether the input-to-output mapping or coupling occurs under conditions wherein a paraxial approximation would be appropriate. In order to achieve optimal or near-optimal mapping or coupling of input and output optical signal modes, the virtual contours defining the diffractive elements are typically complicated and may be calculated by computation of interference between simulated optical fields representing the input and output optical signal beams that the diffractive element set is intended to couple.

The diffractive element sets (also referred to as distributed optical structures) designed as disclosed herein may provide substantially full waveform reconstruction and/or manipulation of input fields. Such may be achieved under conditions (e.g. non-paraxial limit or extended optical sources) where simple imaging structures (e.g. conic sections) may not provide sufficiently optimized mapping or coupling, and may enable substantially optimized beam routing or highly efficient coupling to various output media (e.g. fiber or channel waveguides). Such waveform control may also be employed in cascading signals through multiple processing diffractive element sets. The diffractive element sets disclosed herein may also enable beam mapping or coupling geometries in slab waveguides such as: acute-, right-, or obtuse-angle bends; forward-focusing or relaying structures; or out-of-plane bends. Diffractive element sets designed as disclosed herein may also enable high-fidelity mapping of spatially extended optical sources (i.e. non-paraxial or non-point-like), or may enable novel beam mapping or coupling functions, such as efficiently converting one mode into another one of different size or profile. Diffractive element sets designed as disclosed herein may be employed in a photonic signal transport structure to provide optical signal routing between multiple sources and receivers without restrictions imposed by signal overlap or intersection. Such a photonic transport layer may provide a basis for on-chip or inter-chip signal transmission in an electronic circuit environment, for example.

FIG. 1 illustrates schematically a method for designing a set of diffractive elements for generating a desired output optical signal beam from a desired input optical signal beam incident on the diffractive element set. At the wavelength of interest, a mathematically-simulated design input optical field 102 exhibiting spatial and spectral properties of the desired input optical signal beam is computationally interfered with a mathematically-simulated design output optical field 104 exhibiting spatial and spectral properties of the desired output optical beam. "Mathematically-simulated" may denote an optical signal simulated analytically or numerically, while "computation" may denote analytical computation or numerical computation. The input and output fields may be given by the real part of:

$$E_{1,2}(\bar{x}, t) = S_{1,2}(\bar{x}) T_{1,2}\left(t - \frac{\partial \bar{k}_{1,2}(\bar{x})}{\partial \omega_{1,2}} \cdot \bar{x}\right) \exp i(\omega_{1,2} t - \bar{k}_{1,2}(\bar{x}) \cdot \bar{x}) \quad (1)$$

where $S_i$ is a spatial mode field amplitude distribution, $T_i$ is a temporal envelope, $\omega_i$ is the optical frequency, $k_i$ is the modal wavevector spatial distribution, and $\partial k_i / \partial \omega_i$ is the inverse of the group velocity. Note that $S_i$ and $k_i$ are related in a manner that satisfies Maxwell's equations, while $\omega_i$, $k_i$, and $\partial k_i / \partial \omega_i$ are related by the dispersion properties of the medium in which the signals propagate. In general the product of $S_i$ and $T_i$ may be normalized in any suitable way. If the optical signals are continuous-wave (cw), then $T_i$ is constant for both signals (assume $T_i=1$). In a first computational step for such continuous-wave optical signals with $\omega_1 \cong \omega_2$, an optical interference pattern between the two optical signal fields is calculated as:

$$I(\bar{x},t) = (E_1(\bar{x},t)+E_2(\bar{x},t))(E_1(\bar{x},t)+E_2(\bar{x},t))^* \qquad (2)$$
$$= |S_1(\bar{x})|^2 + |S_2(\bar{x})|^2 + 2|S_1(\bar{x})||S_2(\bar{x})|\cos(\Delta \bar{k}(\bar{x})\cdot\bar{x}+\varphi(\bar{x}))$$

where $\Delta k \equiv k_2 - k_1$ and $\phi \equiv \text{Arg}(S_1 S_2^*)$ (all functions of position). Designs for various types of diffractive element sets may be derived from the interference pattern in several ways. In many examples (but not all), the first two terms of Eq. 2 are discarded, and a diffractive element design is derived from the third term of Eq. 2 (referred to as the interferogram 106).

For the specific case of two interfering fields, the interferogram may be decomposed into three factors: a first magnitude factor $|S_1(x)|$, which spatially varies in proportion to the magnitude of the simulated design input optical field; a second magnitude factor $|S_2(x)|$, which spatially varies in proportion to the magnitude of the simulated design output optical field; and a phase factor $\cos(\Delta k \cdot x + \phi)$, which depends on the phase difference between the simulated design input and output optical fields and which typically varies spatially on a relatively rapid scale. The product $|S_1(x)||S_2(x)|$ may be referred to as the interferogram intensity function, while $\cos(\Delta k \cdot x + \phi)$ may be referred to as the interferogram phase function. In many instances only the interferogram phase function is employed for designing a diffractive element set, while in other instances the interferogram intensity function or one of the individual magnitude factors may be employed as well. It is understood that the mathematical expression given for simulated design input and output fields is only one possible expression for such fields and others may be used as well. In all cases, an interference pattern may be calculated, which may be decomposed into terms analogous to those given above. Any suitable mathematical expressions for simulated design optical beams or the resulting interference pattern or interferogram shall fall within the scope of the present disclosure.

Optical fields used for interference pattern generation may be realizable by physical sources, however, the present disclosure also encompasses use of simulated design fields that are merely theoretical and may or may not be conveniently obtainable with actual light sources or in the waveguide geometries of interest. Moreover, when using actual optical signals to generate an interference pattern, it is not possible to drop the first two terms of Eq. 2 to isolate the interferogram, as is possible when using simulated optical signals. Many of the exemplary embodiments shown and described herein may include the use of only two simulated design fields to generate the interference pattern. More generally, three or more simulated optical fields maybe employed for forming an interference pattern and for designing diffractive element sets, and such use of three or more simulated design optical fields shall fall within the scope of the present disclosure or appended claims. Such multi-beam-interference-designed distributed optical structures may be useful for coupling multiple input signals to a single output port, a single input signal to multiple output ports, or multiple inputs each to one or more outputs.

A design for a diffractive element set may be derived from the interferogram. A diffractive element set in a slab waveguide maybe regarded as a two-dimensional spatial distribution of optical field reflection strength, which may also be referred to as a diffractive strength distribution. The diffractive strength distribution is derived computationally from the interferogram by a well-defined mapping of the value of the interferogram (either as originally generated from the simulated fields or suitably modified thereafter) at a given position to an optical field reflection coefficient value at that position. The diffractive strength distribution may be realized physically in various ways, many of which are described in the various references cited hereinabove, some of which are described briefly hereinbelow. Typically, a diffractive element set comprising the diffractive strength distribution is fabricated in the form of a two-dimensional refractive index distribution or a two-dimensional distribution of discrete partially reflective boundaries. Such a distribution may be fabricated in various ways, e.g. by etching trenches in the core of the slab waveguide and subsequent filling with cladding material, by etching the array in a separate waveguide core sublayer subsequently filled with a different material, or by photomodification of the local refractive index (either direct or with a phase mask) in the waveguide core or cladding.

Figure 2:
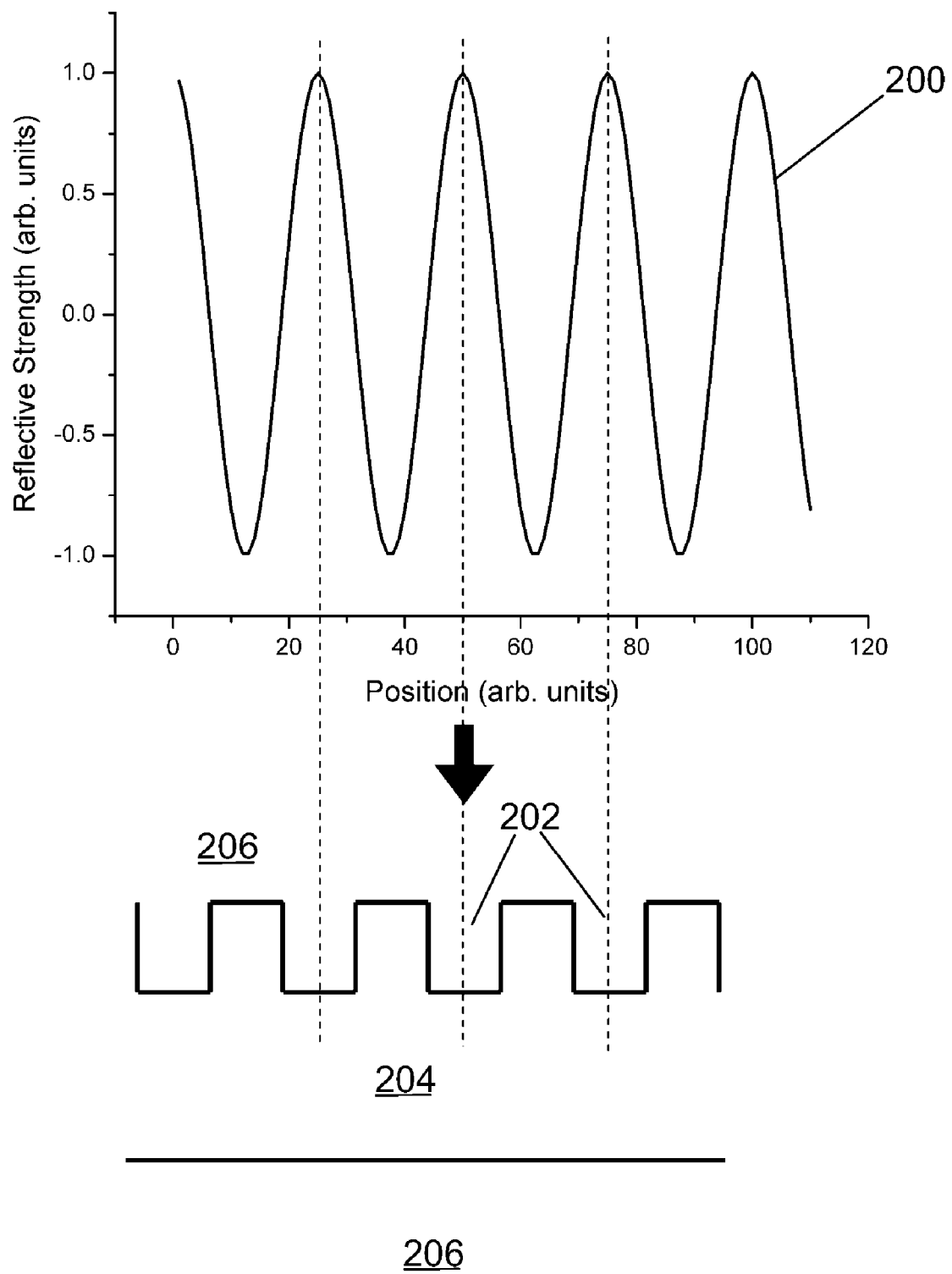
FIG. 2 illustrates an exemplary interferogram phase function and a schematic cross-section of corresponding diffractive elements and their positions relative to the interferogram.

It is often the case that the diffractive element set (or equivalently, the diffractive strength distribution or the refractive index distribution) may be designed and formed according to the computed interferogram phase function alone. The phase function may be translated or mapped into a suitable refractive index distribution or partially reflective interface distribution either by faithfully replicating the explicit functional dependence of the trigonometric function of the phase difference, or by approximating the trigonometric function of the phase difference by other functions such as a step function, sawtooth function, a triangular function, or other approximating function, or by any other suitable algorithm. Alternatively, the continuous, analog phase function may be approximated by a finite number of discrete levels of diffractive strength or refractive index variation. In one example, the phase function of the interferogram may be digitized by using only points corresponding to local maxima of the phase function 200 (as in the upper portion of FIG. 2). The resulting set of contours comprises contour lines on which the phase difference between the two interfering simulated optical beams is zero. Contours defined by values other than zero for the interferogram phase function could be employed as well. A set of diffractive elements may be fabricated by forming diffractive elements positioned relative to these virtual contours so as to yield a desired spectral or temporal transfer function for the diffractive element set. For example, trenches 202 (shown in cross-section in the lower portion of FIG. 2) may be etched on the waveguide core 204 along the zero-phase-difference contours and then filled with the material forming cladding 206, resulting in two partially reflective boundaries per diffractive element. The computed contour line may be used as a center or an edge or another part of the trench constituting the diffractive element. For the exemplary embodiment of FIG. 2, one suitable value for the width of the trench might be $\lambda/4$, where $\lambda$ is the operational wavelength of the optical signals in the material filling the trench. Other suitable trench widths may be employed as well, and the trench width may be varied to control the reflective amplitude of each diffractive element. Maximum reflectivity for a diffractive element may be achieved when reflections contributing to the output beam from the front and back surfaces of the diffractive element constructively interfere. Minimum reflectivity may be achieved when reflections contributing to the output beam from the front and back surfaces destructively interfere, or when no diffractive element is formed at all for a particular contour defined by the interferogram. Other geometries for the diffractive elements may be employed as well, such as ribs of core material protruding into the cladding, for example.

The calculated interferogram intensity function or one of the individual magnitude factors thereof may be utilized in several different ways for designing a diffractive element set. First, as already disclosed hereinabove, the calculated interferogram intensity function may not be used at all but rather set to unity, so that the design of the diffractive element set arises from the interferogram phase function only. Second, when calculating the diffractive strength distribution for a diffractive element set, the calculated interferogram intensity function may be used in combination with the interferogram phase function. In this second example, along the zero phase difference (or other chosen constant phase difference) contours, the value of the diffractive strength distribution varies in proportion to the product of the simulated design optical field magnitudes. In a variation of this second example, a relative scaling factor for the simulated field magnitudes may be introduced. Third, the magnitude of one or the other (but not both) of the simulated optical fields may be employed along with the interferogram phase function to generate the diffractive strength distribution. Fourth, the interferogram intensity function may be replaced by an entirely different intensity function (chosen to yield a desired spatial, spectral, or temporal transfer function and often referred to as an apodization function), combined with the interferogram phase function, and translated into a diffractive strength distribution. Each of these scenarios is described further hereinbelow.

FIGS. 3A-3C schematically illustrate an exemplary embodiment of a slab waveguide 300 with a diffractive element set 302. Two simulated counter-propagating design optical field modes 304 and 306 are computationally interfered, as indicated schematically in FIG. 3A. In this example the simulated design optical signal beams have equal minimum waists of 6 μm both located at the origin 301. The origin 301 may therefore represent the location of a common input/output port, for example, while the line 303 substantially containing the minimum waists of the simulated design fields may be referred to as the input or output plane. The diffractive contours shown in the schematic top view of the exemplary device in FIG. 3B are generated by setting the interferogram intensity function to unity and finding phase contours corresponding to zero phase difference between the simulated fields (i.e. as in the method illustrated in FIG. 2). As seen in the device cross-section of FIG. 3C, the contours are then implemented as etched trenches 314 in core 316 that are filled with cladding material 318. The center of the diffractive element set is about 100 μm away from the origin. In the example of FIGS. 3A-3C, the two simulated design optical fields create an interferogram of infinite extent. However, only a subsection of the interferogram is used to design the diffractive element set, the infinite interferogram being truncated both along the direction of beam propagation as well as in a direction substantially perpendicular thereto. As can be seen in the FIG. 3B, the diffractive elements begin only at a certain minimum distance from the minimum beam waist and end a finite distance thereafter, while they are also of finite angular width. When thus truncating the set of contours derived from the interferogram, the chosen length (along the desired propagation directions) of the diffractive element set should be consistent with the desired spectral or temporal characteristics of the diffractive element set. Similarly, it may be desirable that the transverse angular extent of the diffractive elements be sufficiently large so as to encompass all portions of the phase contours that have a non-negligible value of the interferogram intensity function, thereby lessening spatial distortion of the output optical signal. Alternatively, transverse truncation may, under certain circumstances, be employed for achieving desired output optical field spatial properties.

Figure 4:
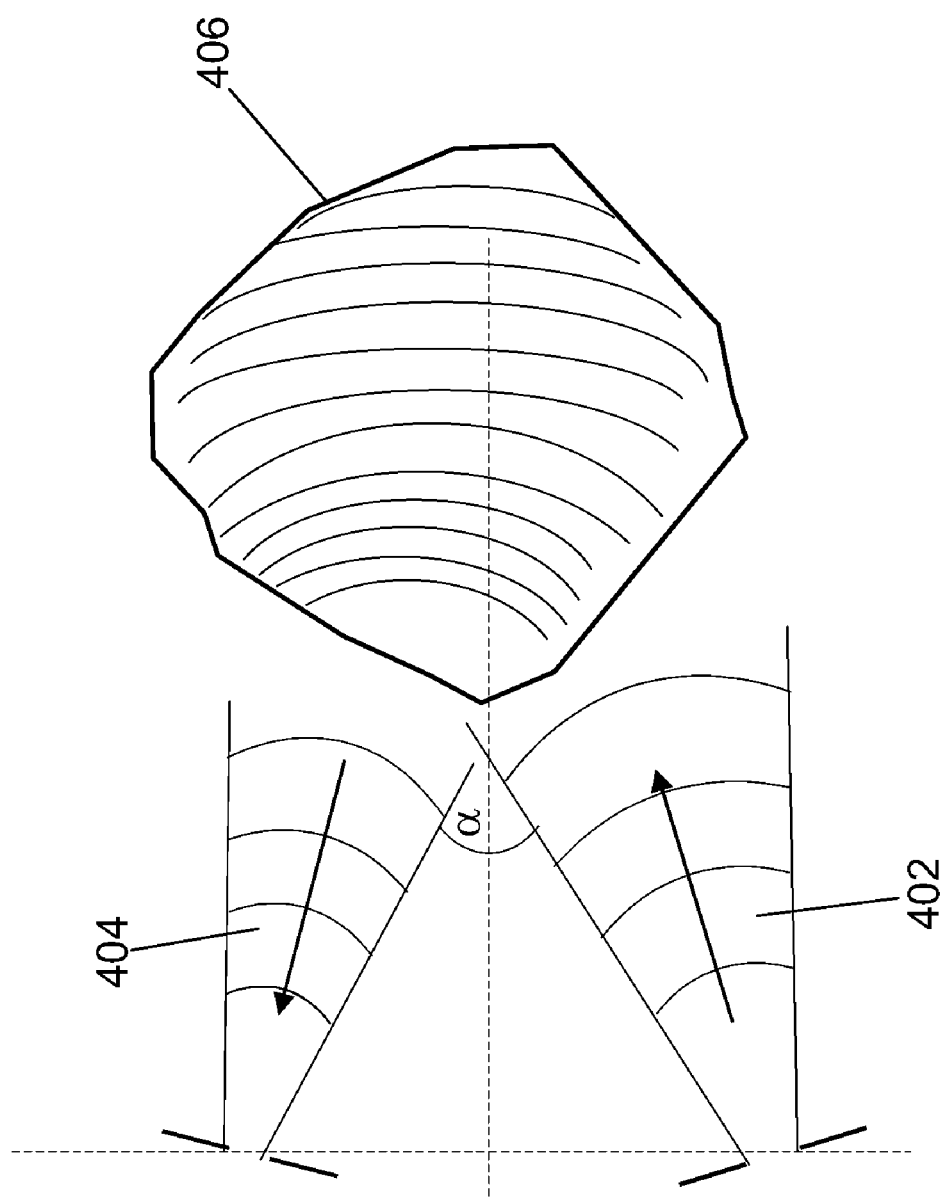
FIG. 4 illustrates schematically simulated design input and output optical signal beams and the resulting interference pattern.

FIG. 4 schematically illustrates another exemplary embodiment, similar to FIG. 3A, in which the simulated design input and output optical signal beams 402 and 404, respectively, each have a minimum beam waist of 6 μm symmetrically displaced by ±15 μm from the origin along the input/output plane as shown in FIG. 4, and cross at an crossing angle α=17°. As used herein, a beam crossing angle of 0° shall designate retro-reflection or back-scattering, while a beam crossing angle of 180° shall designate forward-reflection or forward scattering. The simulated design field modes are interfered computationally to create an interferogram, and the interferogram phase function alone is employed for forming the diffractive element set 406. Beam propagation directions are as indicated in the FIG. 4. The center of the interferogram, and hence the resulting diffractive element set, is located about 100 μm from the origin.

Figure 5:
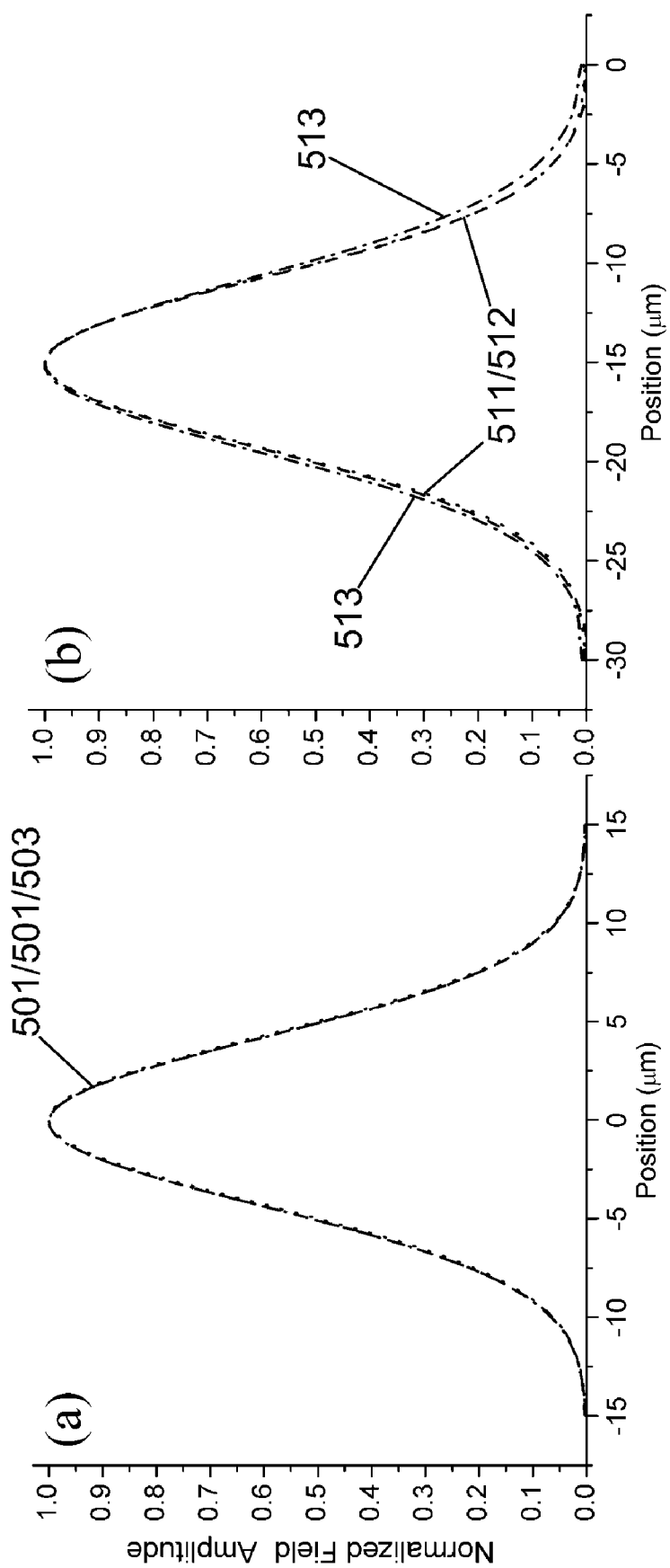
FIG. 5 shows spatial mode profiles for simulated design input beams and output beams calculated to arise from model diffractive element sets.

A Fresnel-Huygens-based diffractive calculation is employed to evaluate the optical characteristics of the designed diffractive element set. A simulated probe input beam, with a minimum waist size and position matching those of the simulated design input beam, is computationally launched, diffracted by a diffractive element set, and a resulting output field distribution is calculated at the location of the design output port. In FIG. 5 are plotted optical beam power profiles calculated for the diffractive element sets designed according to FIGS. 3A-3C and FIG. 4 (i.e. designed interferometrically) and for a reference diffractive element comprising concentric circular diffractive elements centered at the origin. Also plotted in FIG. 5 for comparison is the profile of the simulated probe input beam. For the nearly retro-reflecting geometry of FIGS. 3A-3C, shown in part (a) of FIG. 5, the spatial profile 501 of the simulated probe input beam, the spatial profile 502 of the output beam calculated to arise from the interferometrically-designed diffractive element set, and spatial profile 503 of the output beam calculated to arise from the reference diffractive element set very nearly coincide; both designed and reference diffractive element sets perform similarly well. In part (b) of FIG. 5 where the beam crossing angle α has been increased to 17°, it is seen that the input beam profile 511 and the output beam profile 512 arising from the interferometrically-designed diffractive element set of FIG. 4 very nearly coincide, while the output beam profile 513 arising from the circular diffractive element set has broadened by about 5% or 10%. Even while still essentially within the paraxial limit (α=17°), an interferometrically-design diffractive element set is measurably superior to the circular diffractive element set in its ability to faithfully generate the desired output spatial beam profile.

Figure 6:
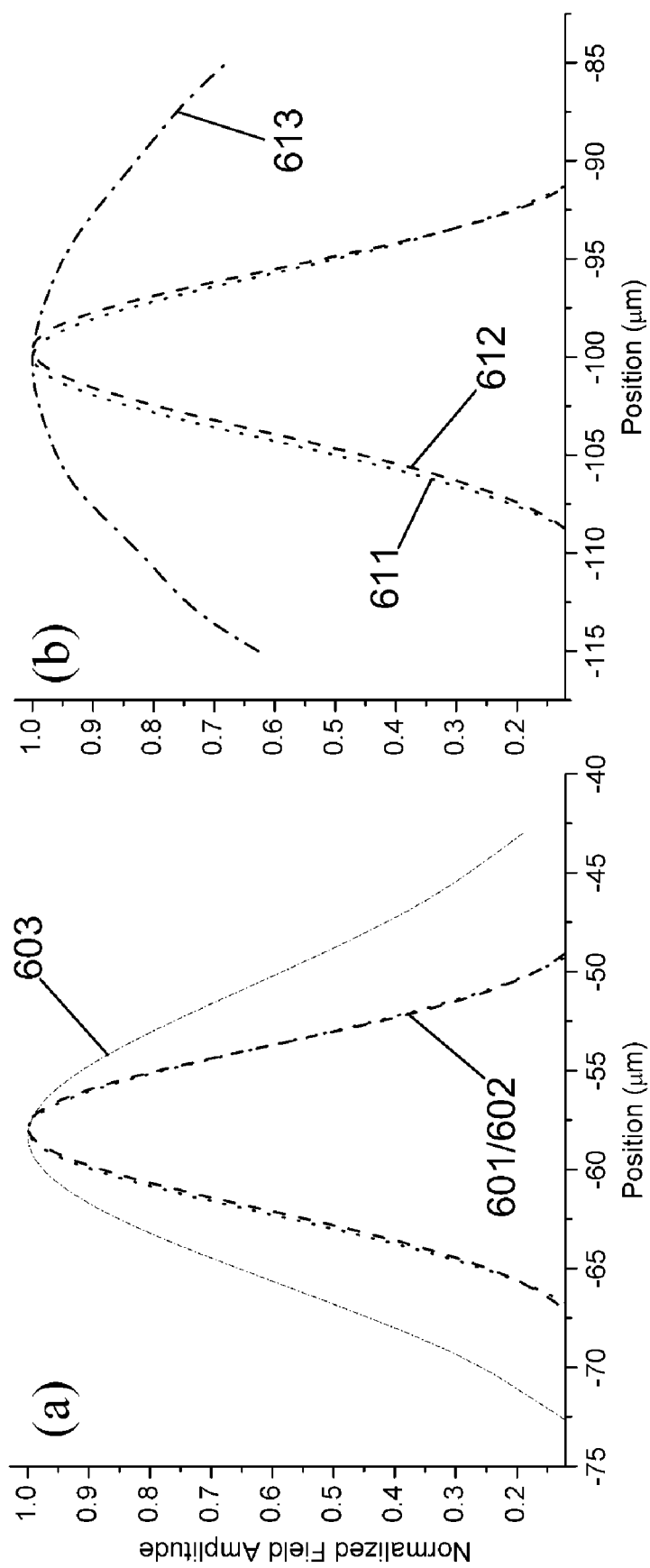
FIG. 6 shows spatial mode profiles for simulated design input beams and output beams calculated to arise from model diffractive element sets.

The superior performance of an interferometrically-designed diffractive element set is even more apparent in FIG. 6, wherein are shown exemplary calculated optical beam profiles analogous to those of FIG. 5 (i.e. inputs 601/611, outputs 602/612 from interferometrically-designed diffractive elements, and outputs 603/613 from circular diffractive elements) for α=60° in part (a) and for α=90° in part (b). The simulated design and probe fields of parts (a) and (b) are mapped between input/output port pairs that are 116 μm and 200 μm apart, respectively, in each case symmetrically displaced about the origin. The interferometrically-designed diffractive element sets provide essentially perfect unity-conjugate-ratio mapping, while the circular diffractive element set exhibits significant transverse broadening. An interferometrically-designed diffractive element set may be designed to provide essentially perfect imaging, and may be designed to do so for angles less than 30° (paraxial or near-paraxial), for angles greater than about 30° (typically non-paraxial), greater than about 60° (non-paraxial), or greater than about 150° (forward-reflecting). Broadening produced by a circular diffractive element set may result in excessive optical loss upon coupling into an output mode similar to the input mode (as would be the case when relaying an input signal from an input fiber to a similar output fiber, for example). Recall that only the phase part of the calculated interferogram was employed for designing these exemplary diffractive element sets.

Figure 7:
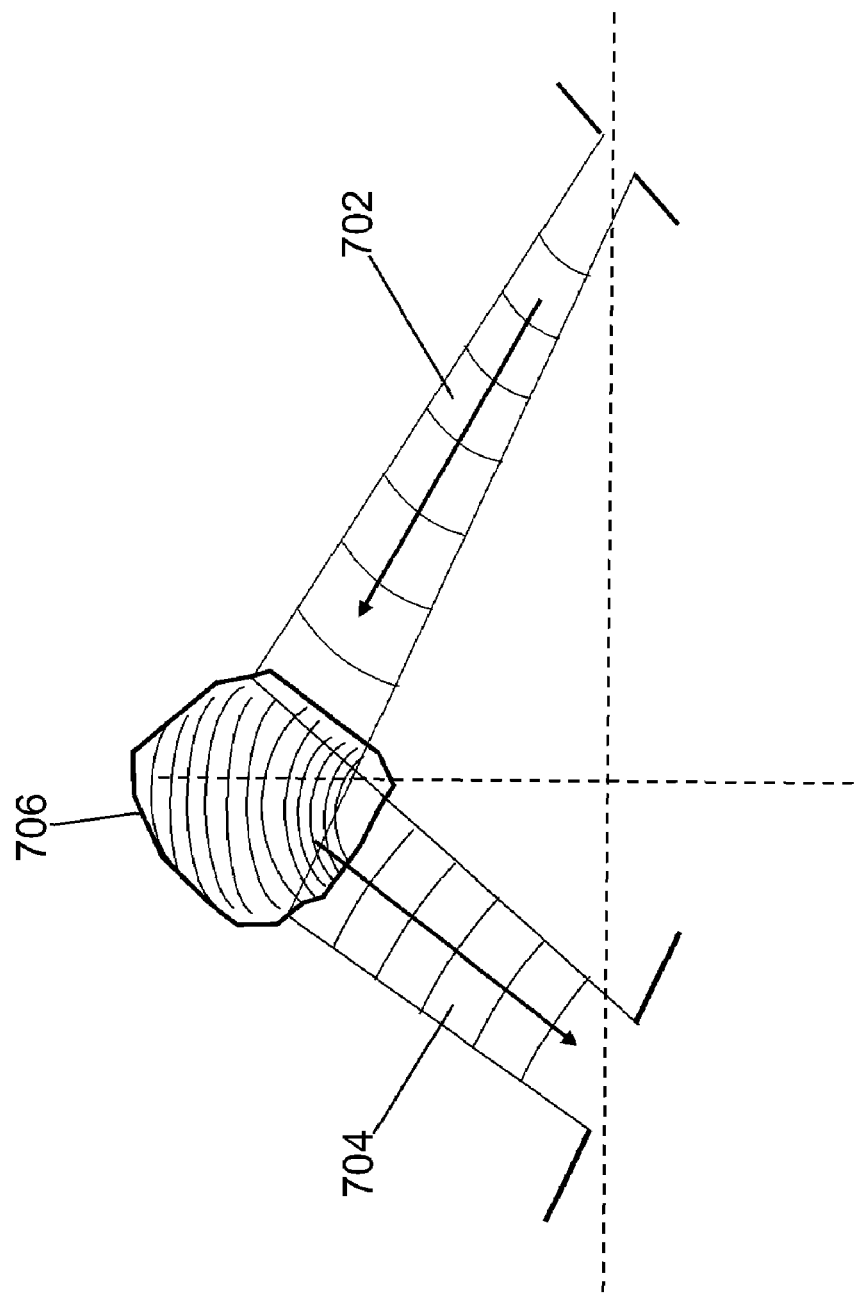
FIG. 7 illustrates schematically simulated design input and output optical signal beams and the resulting interference pattern.
Figure 8:
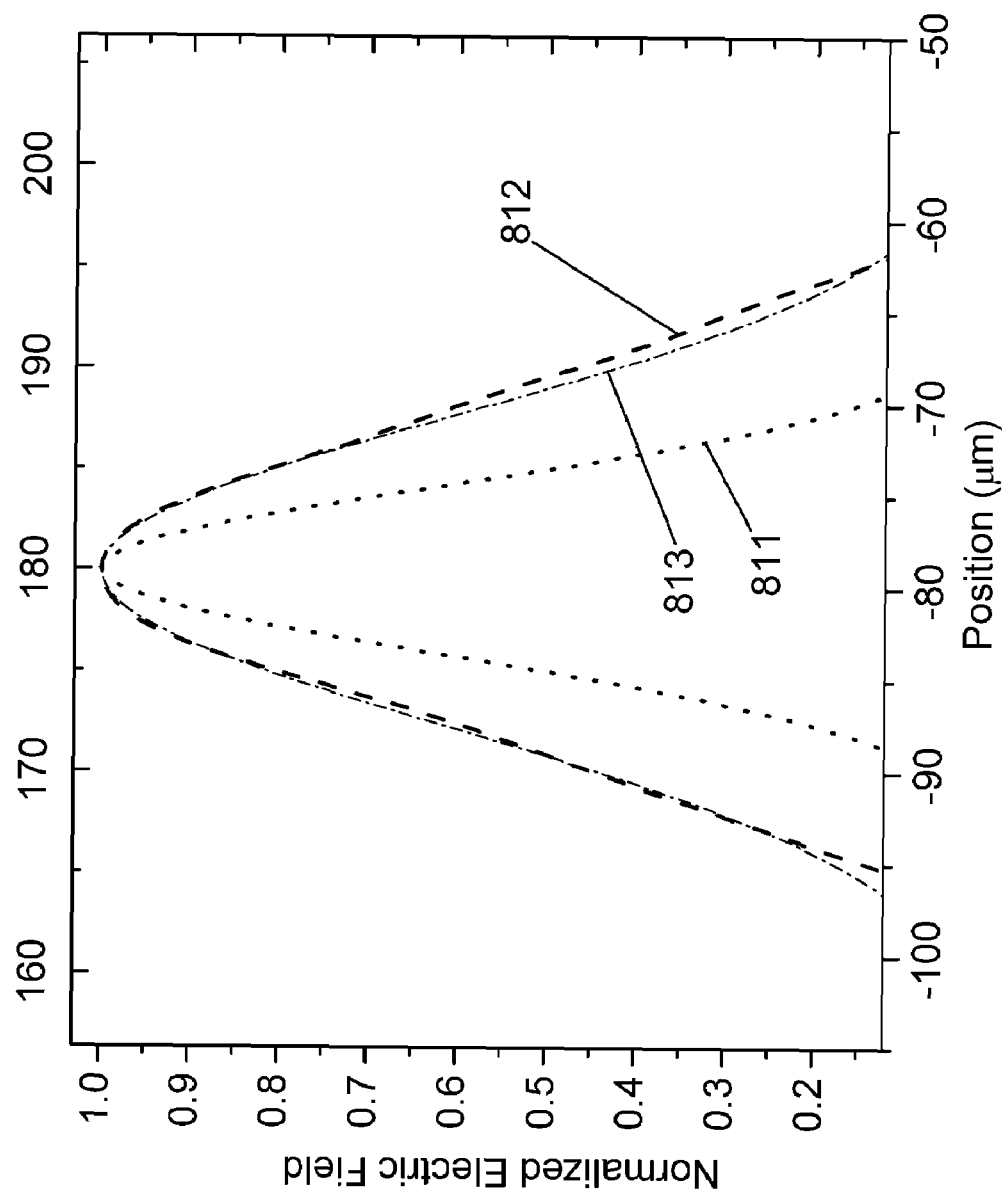
FIG. 8 shows spatial mode profiles for simulated design input and output beams and output beams calculated to arise from model diffractive element sets.

FIG. 7 illustrates another exemplary embodiment. The diffractive element set 706 is designed by computed interference of simulated design input generating beam 702 and simulated design output generating beam 704. Diffractive element set 706 is designed to couple optical beams having differing sizes in the limit of non-paraxial imaging. The diffractive elements are designed by calculating the interference pattern between a simulated design input field with a minimum waist of 6 µm located 180 µm away from the origin on the input/output plane and a simulated design output field with a waist of 12 µm located about 80 µm from the origin on the opposite side. The angle between input and output fields is about 100°. To derive the diffractive structure from the interferogram, only the interferogram phase function is used while the interferogram intensity function is set equal to unity. FIG. 8 details the performance of the designed diffractive element set. The output beam produced by the diffractive element set 706 in response to a simulated input probe beam (beam profile 811 in FIG. 8) with spatial properties identical to that of the simulated design input optical beam is calculated to be the output beam (profile 812 in FIG. 8). It is apparent that the calculated output beam matches the spatial properties of the simulated output design field (beam profile 813 in FIG. 8). As can be seen, the diffractive element set converts the simulated design input probe field to a calculated output field with a waist of 12 µm, i.e. an output field with twice the waist size of the input field. Such spatial mode conversion functionality may not be readily achieved with simple circular (or other conic section) diffractive element sets.

The presently disclosed methods for designing substantially optimized diffractive element sets by computed interference of simulated optical signals may be generalized to devices connecting one input port to multiple output ports, multiple input ports to one output port, or more complex combinations of one-or-more inputs to one-or-more outputs. Several methods may be used to design and fabricate such devices, which may include multiple diffractive element sets.

Figure 9:
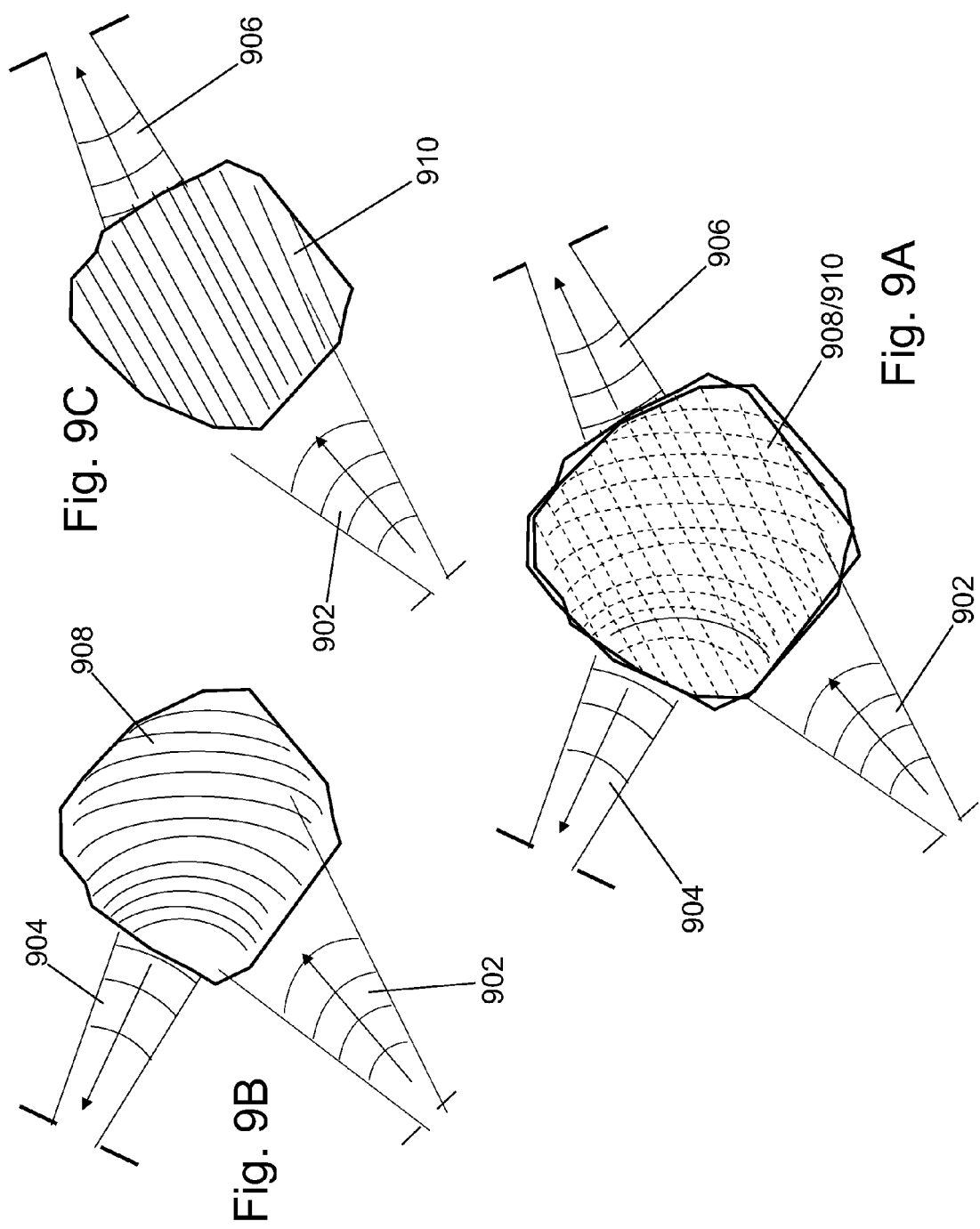
FIGS. 9A-9C illustrate schematically simulated design input and output optical signal beams and the resulting interference patterns.
Figure 10:
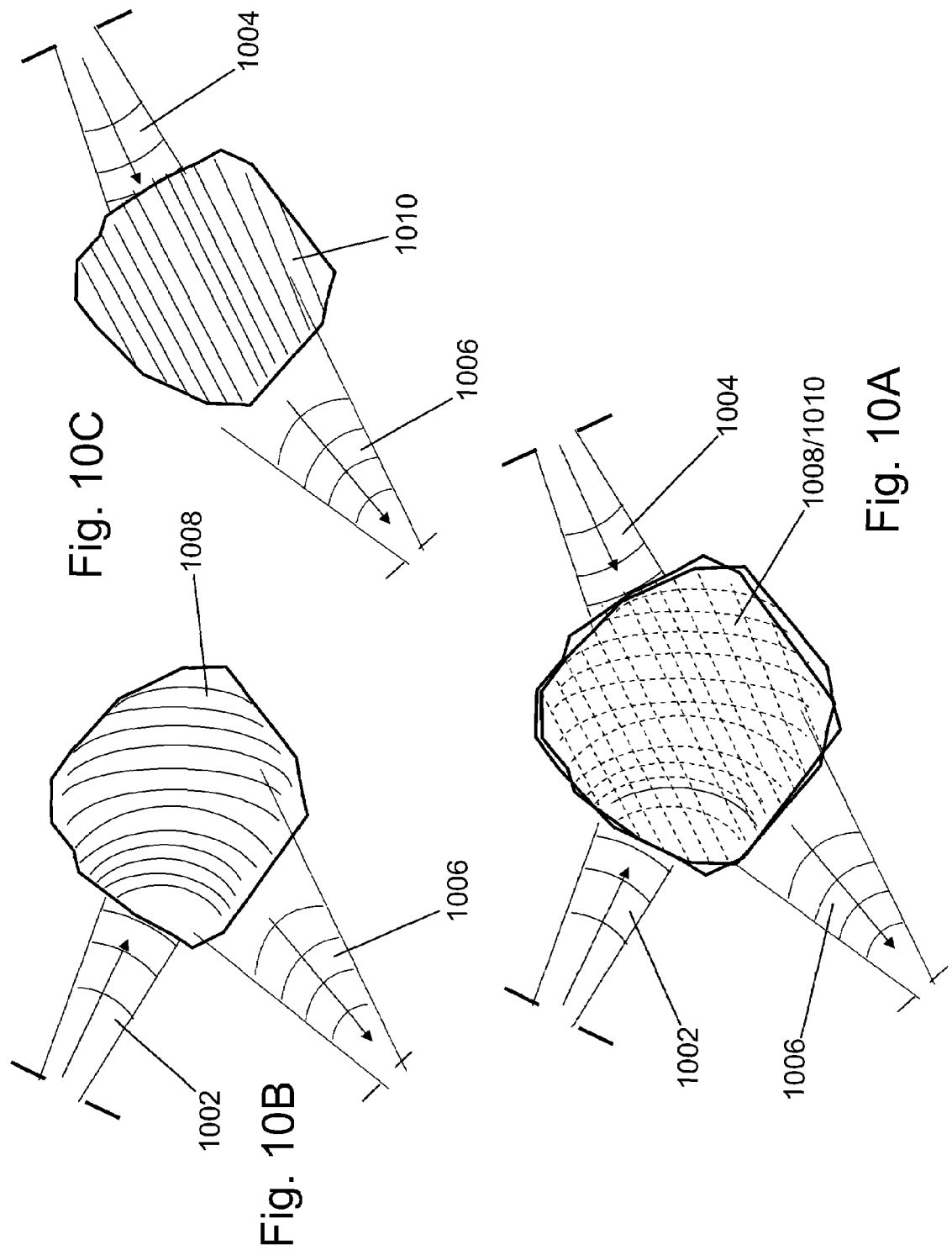
FIGS. 10A-10C illustrate schematically simulated design input and output optical signal beams and the resulting interference patterns.

In a first exemplary method, pairwise interference patterns are calculated and the corresponding designed diffractive element sets are then superimposed on a common planar waveguide. Specifically, for a splitter or demultiplexer device as shown in FIG. 9A, a first interferogram 908 is calculated by interfering the simulated design input field 902 with a first simulated design output field 904 (FIG. 9B). A second interferogram 910 is calculated by interfering simulated design input field 902 and simulated design output field 906 (FIG. 9C). A diffractive strength distribution for each diffractive element set is derived from the corresponding interferogram as described herein. The corresponding two distributed optical structures may then be overlaid to form the splitter or demultiplexer device. Overlay of the two diffractive element sets may be achieved in any suitable way, including those set forth in the various references incorporated herein. The diffractive element sets may partially spatially overlap, or spatial overlap of the diffractive element sets may be reduced or substantially eliminated by displacement of diffractive contours by appropriate spatial displacements and/or by partial writing of the individual diffractive elements of one or both sets. Analogously, a combiner or multiplexer device could be fabricated by overlay of individual diffractive element sets derived as described above from the pair-wise interferograms 1008/1010 formed by two individual simulated design input beams 1002/1004 and a single simulated design output beam 1006 (FIGS. 10A-10C). Note that the combination of the two input fields into a single common output mode via different diffractive element sets as described here may in general be phase-sensitive, i.e. when both inputs are simultaneously incident on the device and of at least overlapping wavelength, the power coupled into the output mode will depend on the phase relationship between the two input beams to the device. The designs of FIGS. 9a-9C and 10A-10C may be generalized to devices with multiple inputs variously coupled to multiple outputs. Note that the superposition of several diffractive element sets in a single device may, under certain circumstances, lead to unwanted coherent scattering of input beams in undesired directions if an input beam happens to be resonant or near resonant with a diffractive element set for which it was not designed. Under other circumstances, such coherent scattering may be exploited for a variety of purposes.

In a second method for designing devices with multiple inputs and/or multiple outputs, an overall interference pattern is computed as a coherent superposition of all simulated design input and output fields at once. Under certain circumstances, unlike the previously discussed two-field interference patterns, the multi-field interference pattern will contain interferogram phase terms that depend on pairs of simulated design input fields or on pairs of simulated design output fields. The two-input terms would typically correspond to coherent scattering from the direction of one input field into that of another input field and may lead to undesirable losses. Since the interference pattern is calculated, terms corresponding to scattering into undesirable directions can be excluded from the interference pattern and thus not appear in the ultimate designed diffractive element set.

As previously mentioned, it should be noted that interferograms derived by the previously described methods preserve phase relationships between the simulated design input and output optical fields. In devices combining two or more input fields into a single output field this may lead to a sensitivity of the power coupled in the output mode to the specific relative phase of the input fields. As phase relationships between physical input fields input to a fabricated device change or deviate from those between the simulated design input fields, the output powers and spatial configurations may change.

Figure 11:
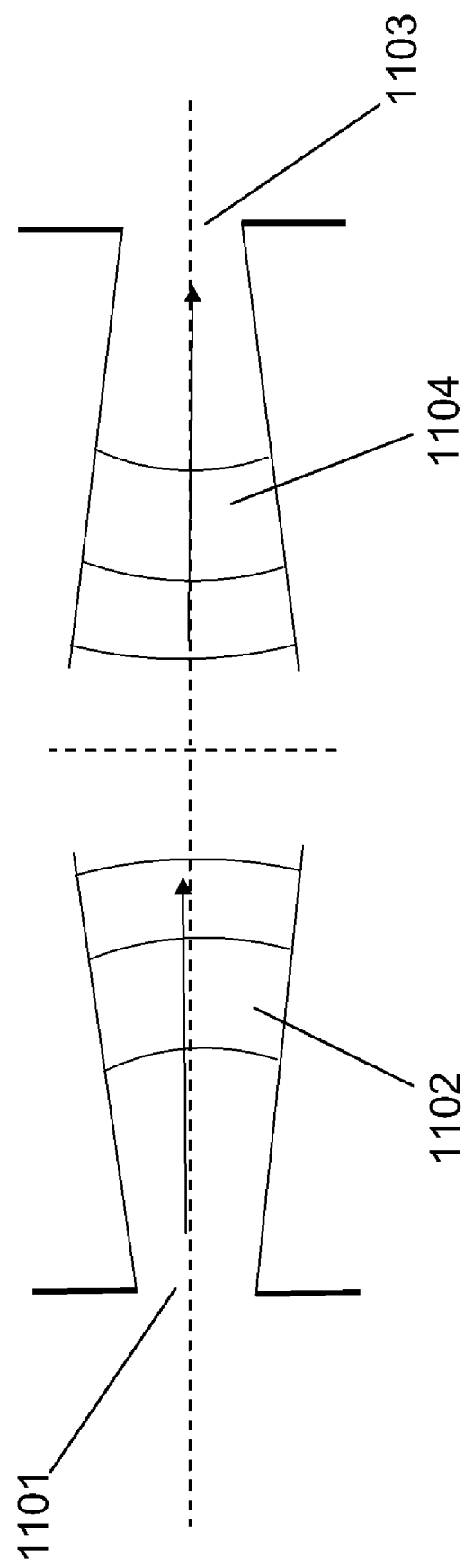
FIG. 11 illustrates schematically simulated design input and output optical signal beams.
Figure 12:
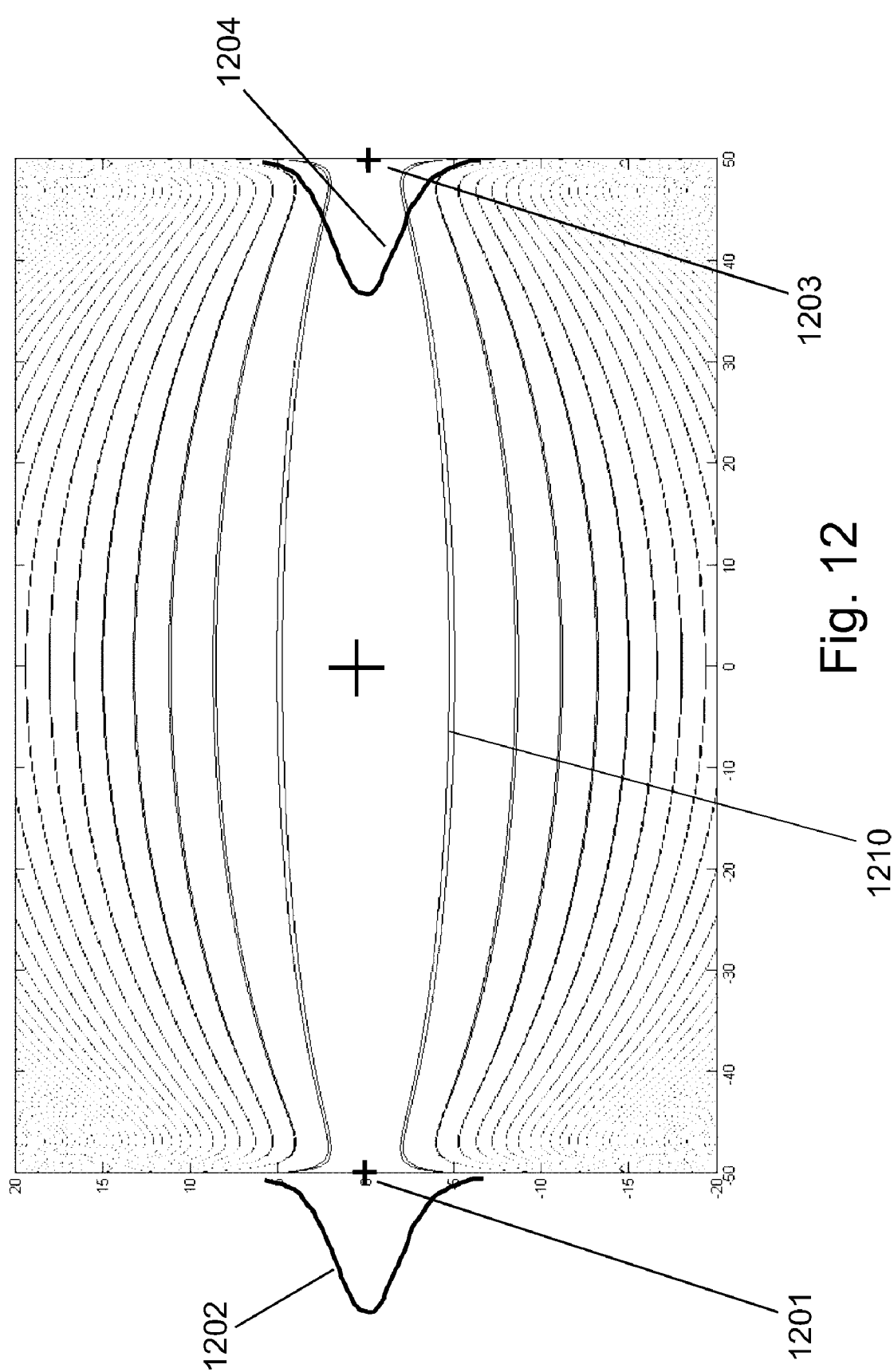
FIG. 12 illustrates an interference pattern resulting from the simulated design optical beams of FIG. 11.

Methods disclosed herein for interferometrically designing diffractive element sets may be employed for designing diffractive structures wherein an optical signal is not necessarily deflected or rerouted from its original propagation direction, but rather is processed with respect to its wave front properties while continuing to propagate along or near its original input direction. Such processing may include, for example, focusing a diverging input beam to form a converging output beam. FIG. 11 illustrates schematically computed interference of a diverging simulated design input field 1102 (beam waist 1 µm located 50 µm from the origin at an input port 1101) and a converging simulated design output field 1104 (beam waist of 1 µm located 50 µm from the origin on the opposite side at an output port 1103). FIG. 12 is a contour plot of the phase function of the resulting interferogram, and also shows the locations 1201 and 1203 of input and output ports 1101 and 1103, respectively, and the spatial mode profiles 1202 and 1204 of the input and output optical signals 1102 and 1104, respectively. Interference maxima (e.g. locations of zero phase difference between the simulated generating fields) lie within the narrow space enclosed by the pairs of parallel contours 1210. A device fabricated with diffractive elements defined relative to these interference maxima will focus a diverging input beam exhibiting the same wave front properties as the simulated design input field to a converging output beam with the same wave front properties the simulated design output beam. Due to the relatively large angles-of-incidence of the input optical signal on the diffractive elements defined relative to the contours of FIG. 12, single contour reflectivity is relatively high and fewer diffractive elements are required to achieve high overall reflectivity of the diffractive element set (tens or a few hundred elements for FIG. 12 versus many hundreds or thousands of elements for FIG. 4, for example). Since fewer elements are required, a device designed according to FIG. 12 functions to focus optical signals over correspondingly larger spectral bandwidths than a device designed according to FIG. 4 (spectral bandwidth varying roughly inversely with optical path between the first and last optical elements of the set). A device with two or more overlapped diffractive element sets, each designed according to an interferogram similar to that of FIG. 12, could be employed as a wide-band optical splitter, for example.

Figure 13A:
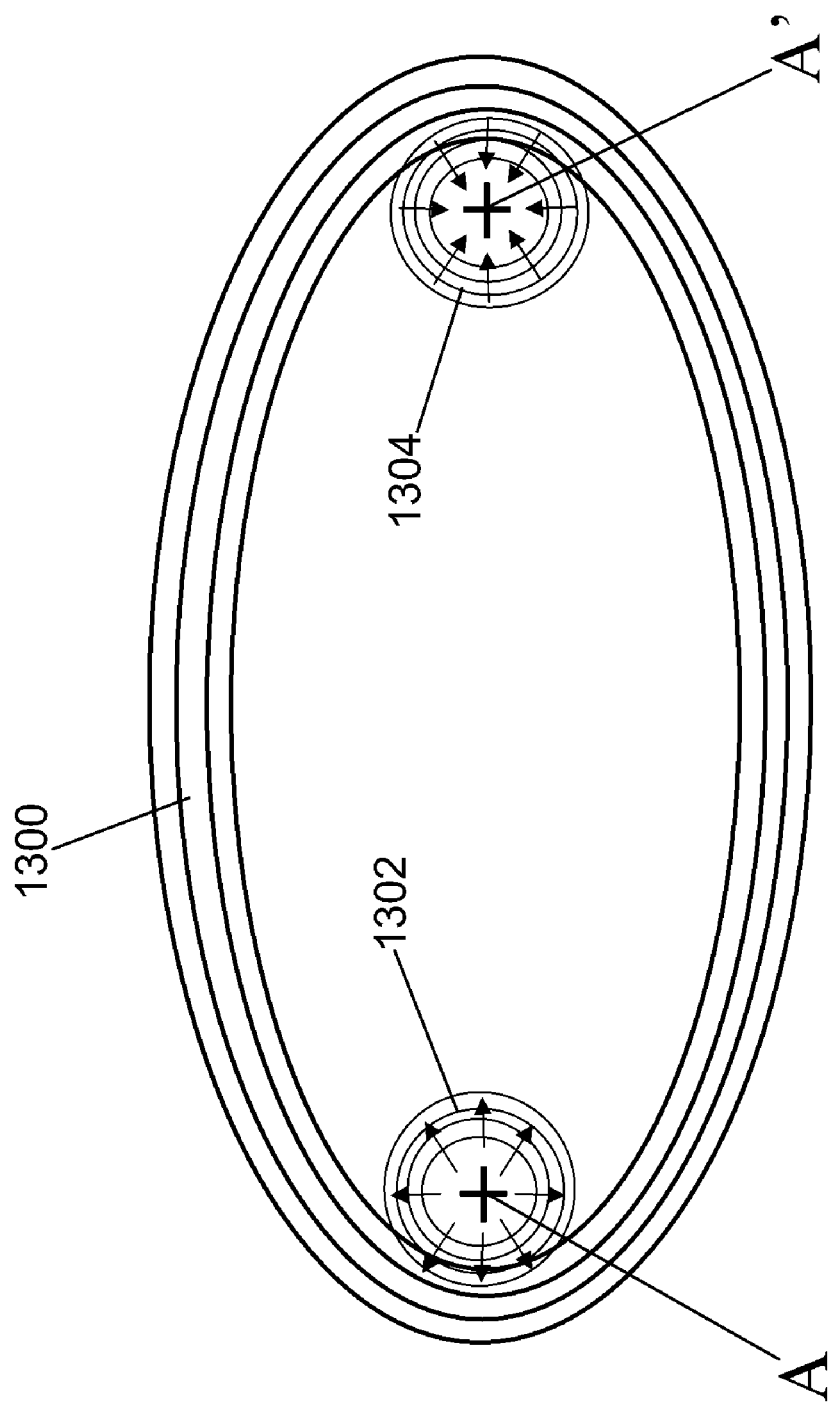
FIG. 13 illustrates schematically simulated design input and output optical signal beams and the resulting interference pattern.
Figure 13B:
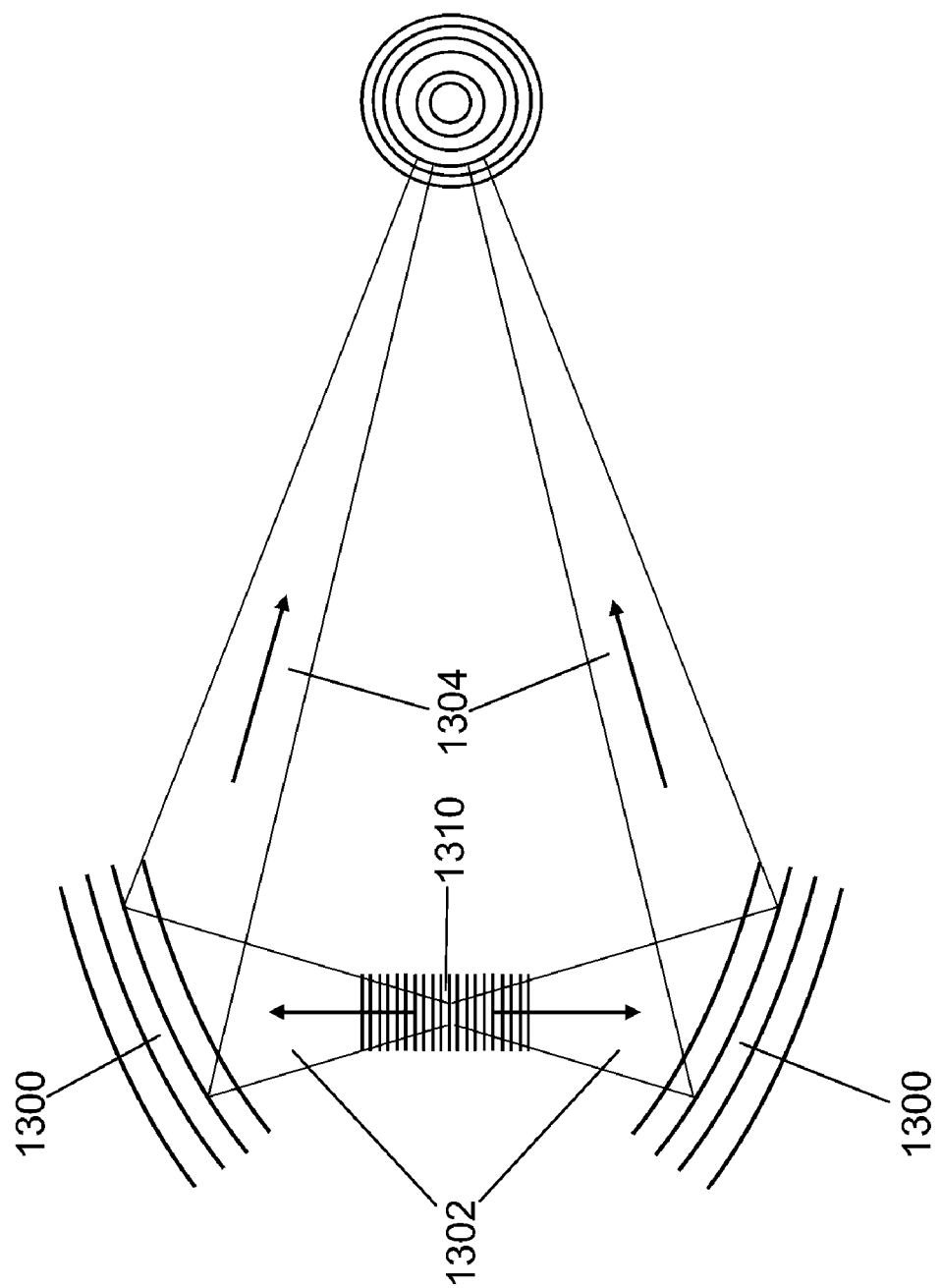

The mapping or coupling capabilities of the presently disclosed invention are not limited to highly-directed beams. FIG. 13A schematically illustrates a diffractive element set 1300 mapping an optical signal 1302 diverging from a localized, wide-angle source A to an optical signal 1304 converging on a localized device output at A'. The diffractive elements of the set 1300 are designed by computed interference of a diverging nearly spherical wave emanating from the localized source (i.e., the nearly circular wave 1302 when projected into two-dimensions) and a converging nearly spherical wave (i.e. the nearly circular wave 1304 upon projection) propagating to a localized wide-angle output. The resulting interferogram has confocal nearly elliptical phase contours with common foci at A and A'. The diffractive elements would be truly elliptical for truly circular-wave (point-like) source and output. For any source other than a point source, interferometrically-designed diffractive element contours are more complicated than ellipses or other conic sections. The point-to-point imaging functionality depicted in FIG. 13A, or the extended-source-to-extended-receiver imaging functionality more generally enabled by design methods disclosed herein, may have applications for optical interconnects at the chip, board, and backplane levels. The interconnects may be primarily in-plane or may include provision for out-of-plane coupling. A modification of the scenario shown in FIG. 13A is shown in FIG. 13B. In FIG. 13B, the input signal emanates outward only in certain directions. The diffractive element set need only be written so as to overlap the directions of input signal propagation. Design of interconnects with many overlapping signals will be facilitated by minimizing area occupied by each diffractive element set as is made possible by input signals propagating in limited angular regions as shown in FIG. 13B. As usual, needed diffractive element sets may be calculated via computational interference of appropriate simulated design input and output (direct to output port or receiver) beams.

Figure 14A:
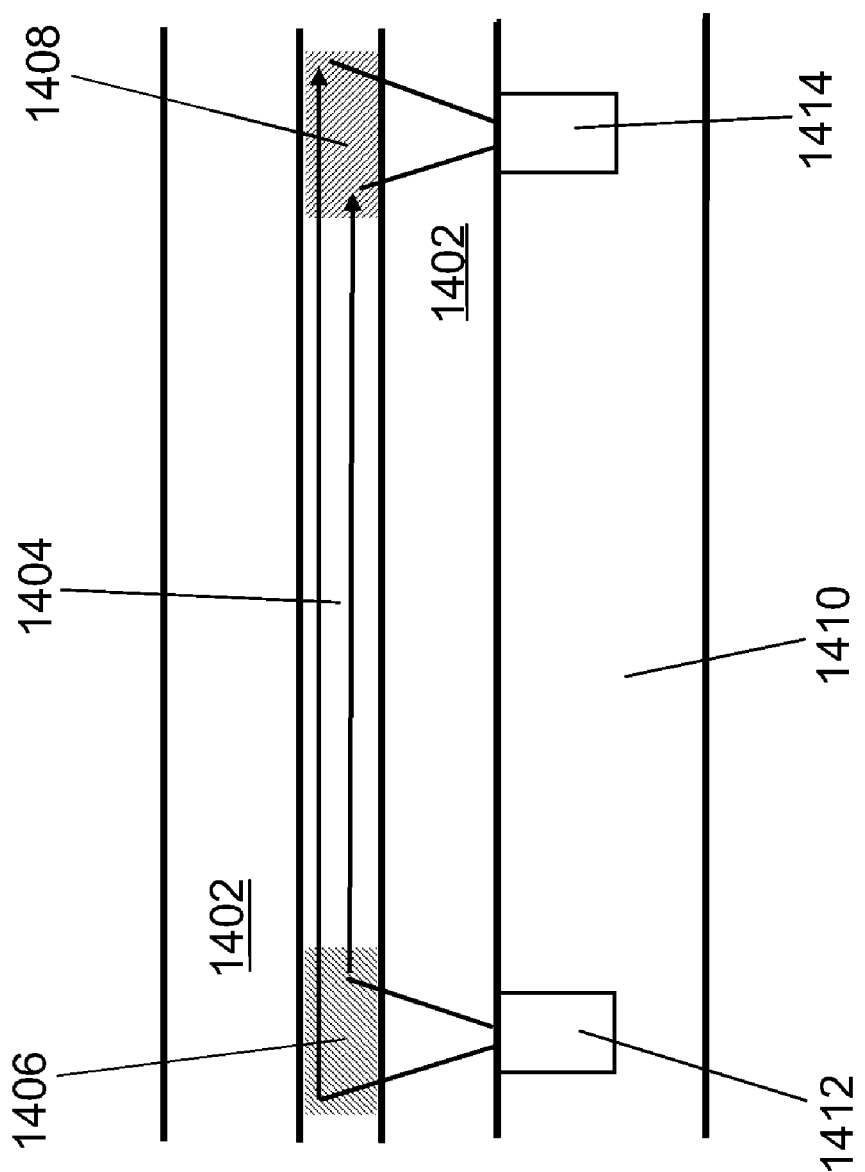
Figure 14B:
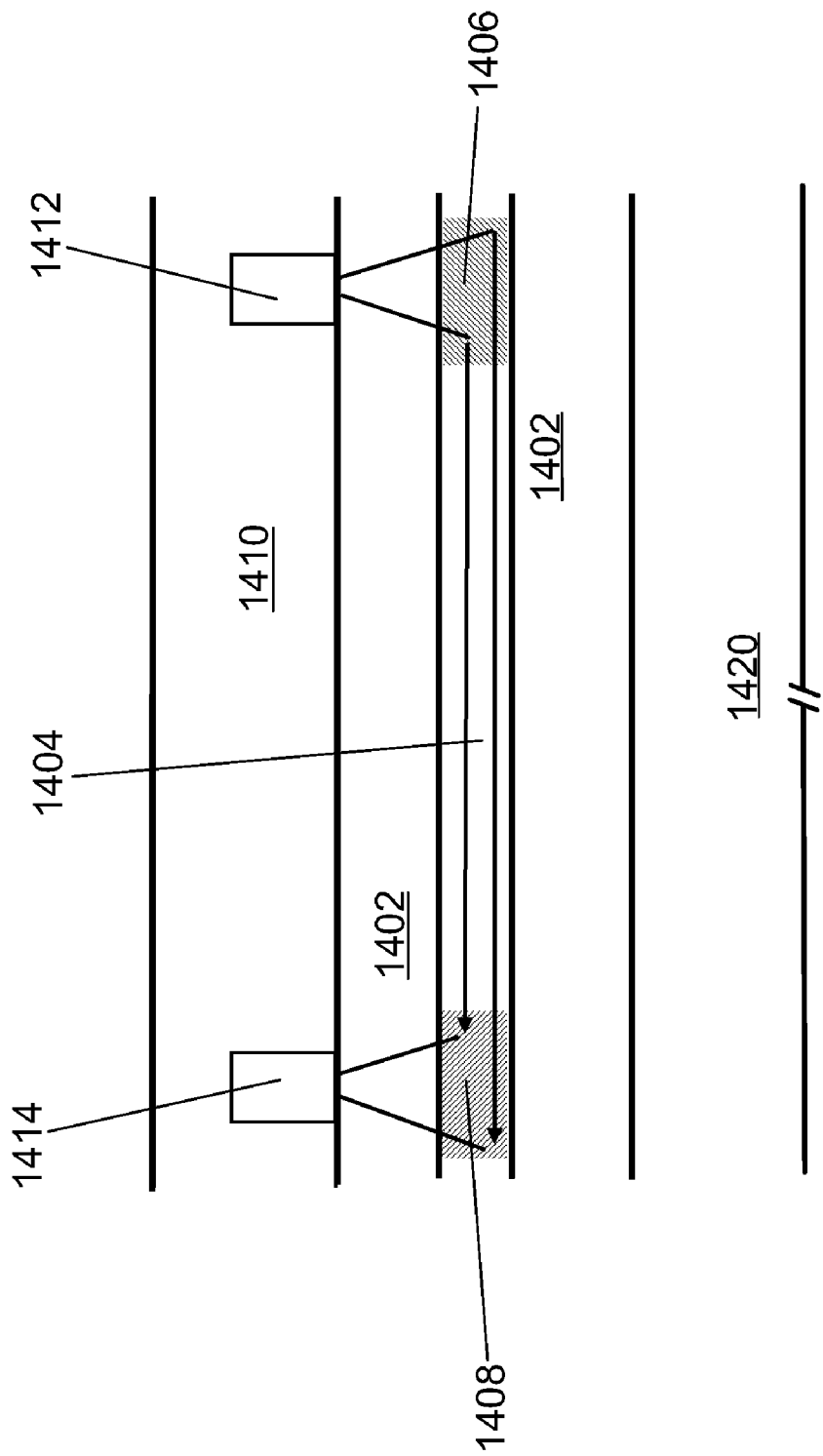

Out-of-plane functionality, useful for optical interconnects in integrated circuits, is illustrated schematically in FIGS. 14A and 14B. In FIG. 14A, photonic transport layer (e.g. a planar waveguide comprising core 1404 and cladding 1402) is formed on an electronic layer stack 1410 containing various integrated circuits (ICs; not explicitly shown). In FIG. 14B, the photonic transport layer is formed on a silicon substrate 1420, and the electronic layer stack 1410 is formed over the photonic transport layer. In either case, at an appropriately located optical launch node 1412 on the electronic layer stack 1410, an optical signal may be launched into the photonic transport layer. It is possible that multiple photonic transport layers may be implemented. A diffractive element set 1406, designed according to computed interferometric methods disclosed herein, launches the input signal from launch node 1412 to propagate in the photonic transport layer toward a second diffractive element set 1408. Diffractive element set 1408, also designed according to computed interferometric methods disclosed herein, receives the optical signal propagating within the photonic transport layer and redirects it onto an optical receiver node 1414 on the electronic layer stack 1410. (At the receiver, any method known in the art to convert in-plane signals to an out-of-plane receiver may be substituted for a diffractive element set.) The diffractive element sets 1406 and 1408 are each designed from an interferogram between the off-chip launch/receiving fields and the desired propagating mode of the photonic transport layer. Additional diffractive element sets in the photonic transport layer may direct optical signals between launch nodes and receiver nodes within the photonic layer. Independent of the nature of the couplers used to couple optical signals into or out of the plane of a planar waveguide, diffractive element sets designed as disclosed herein may be employed to improve coupling efficiency of the coupler by converting in-plane modes easily produced by the coupler into a more optimal or desired spatial mode or modes. In one example, a divergent beam coupled into the plane using a tilted waveguide facet is converted by a diffractive element set into a convergent beam. In another example, a linear second-order grating 1310 in a planar waveguide couples a light beam normally incident from above the planar waveguide producing two modes propagating in opposite directions (see FIG. 13B). A diffractive element set designed as disclosed herein may route both such modes into a single in-plane receiver or out-of-plane receiver coupler. For each specific input coupler, its natural in-plane mode distribution and a desired in-plane mode distribution may be used as simulated design input and output beams to compute the diffractive element set converting between the mode distributions. Such an approach may be used to optimize both into plane and out-of-plane couplers.

Instead of directing the launched off-chip optical signal into the photonic transport layer directly toward the receiver node, diffractive element set 1406 may instead be configured or arranged to couple the off-chip optical signal launched from an out-of-plane angle to the photonic transport layer to a circular mode resembling the input signal 1302 of FIG. 13A. This might be accomplished using an second-order grating structure, for example. This may be designed by computing the interference pattern between the off-chip launched signal and an outwardly-propagating circular wave propagating in the photonic transport layer. Similarly, diffractive element set 1408 may be designed by computing the interference pattern between an inwardly-propagating circular wave (resembling the output signal 1304 of FIG. 13A) and an off-chip signal directed toward the optical receiver 1414. A third diffractive element set (not shown) may be designed by computing the interference pattern between the outwardly-and inwardly-propagating circular waves, and the resulting diffractive contours would resemble distributed optical structure 1300 of FIG. 13A.

Figure 15:
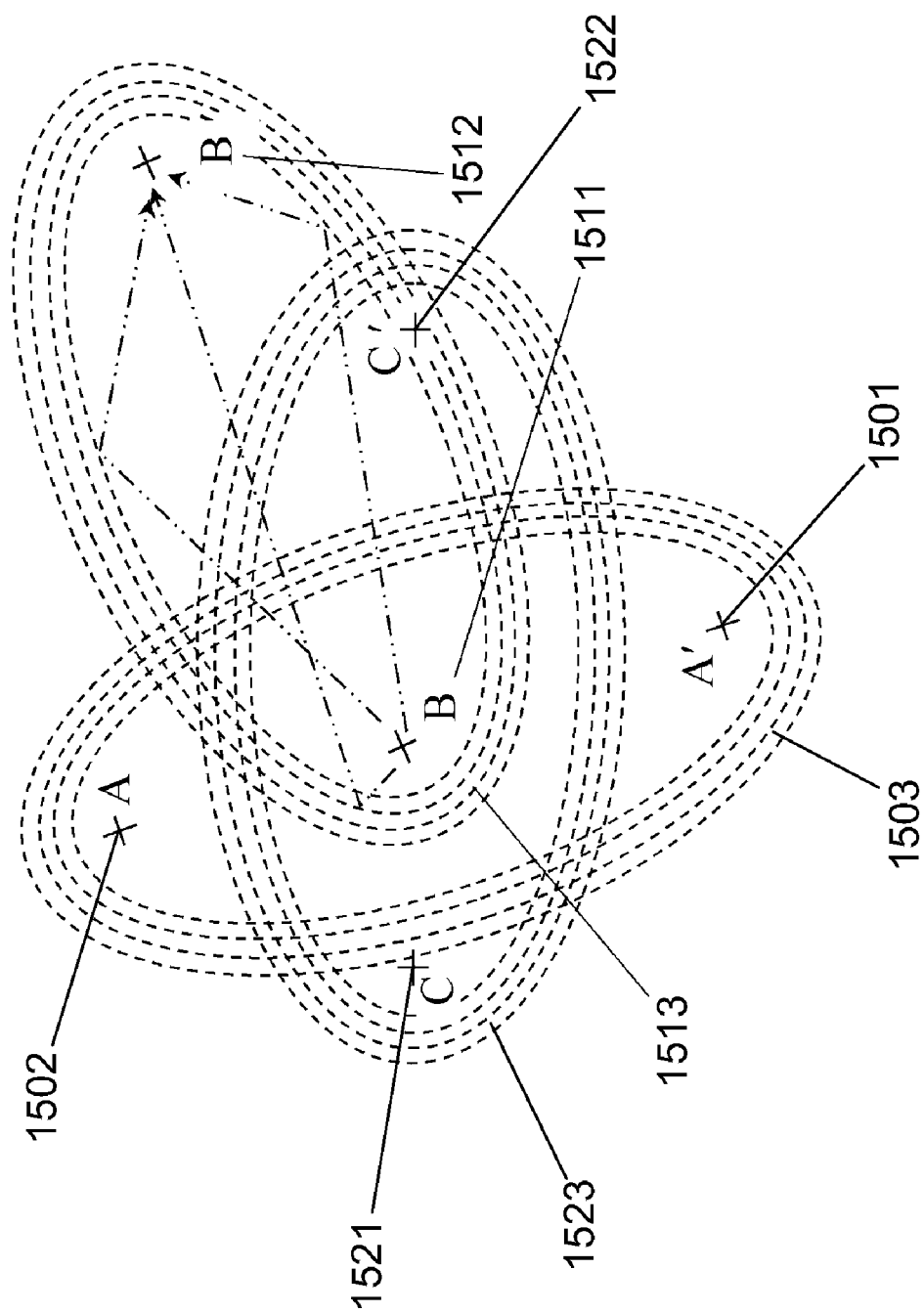
FIG. 15 illustrates schematically multiple diffractive element sets.

Multiple optical signals may freely overlap in these architectures, thereby eliminating routing constraints associated with wire-based or channel-waveguide-based signal transport. This is illustrated schematically in FIG. 15 in a top view of an exemplary interconnect structure wherein three transmitter/receiver pairs (1501/1502, 1511/1512, 1521/1522) are optical coupled through a photonic transport layer by respective overlaid diffractive element sets 1503,1513, and 1523.

Figure 14C:
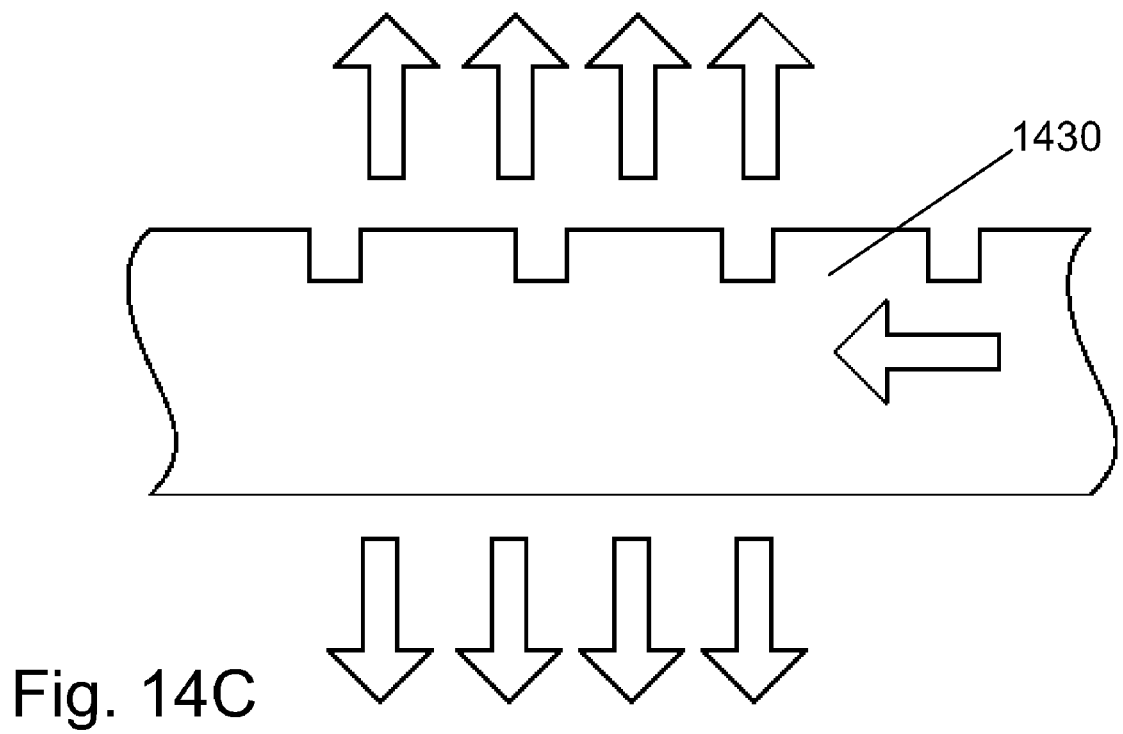
FIGS. 14C and 14D illustrate diffractive elements for on/off-chip redirection of optical signals.
Figure 14D:
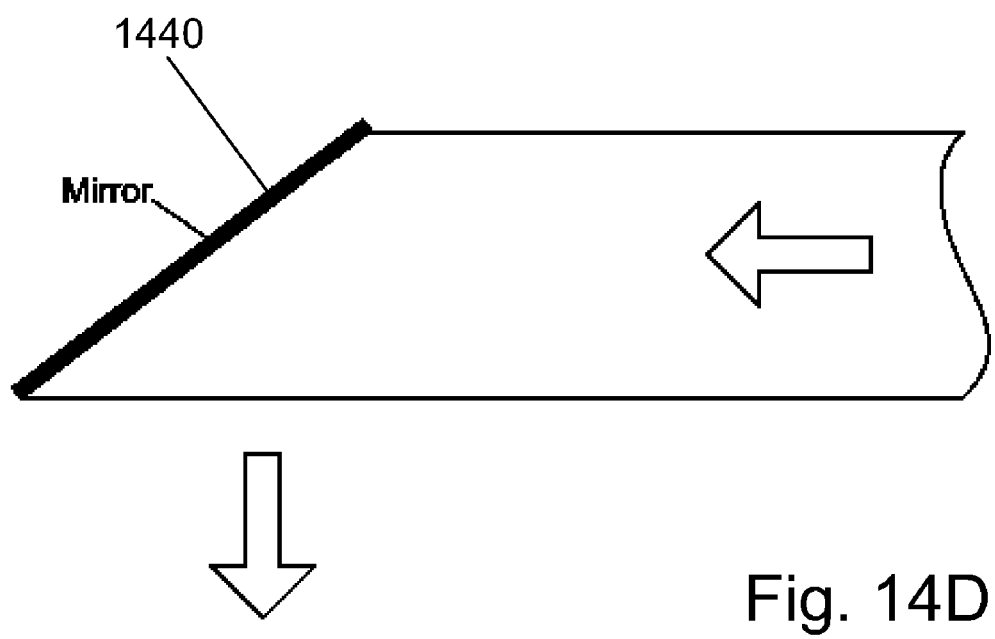
Figure 14E:
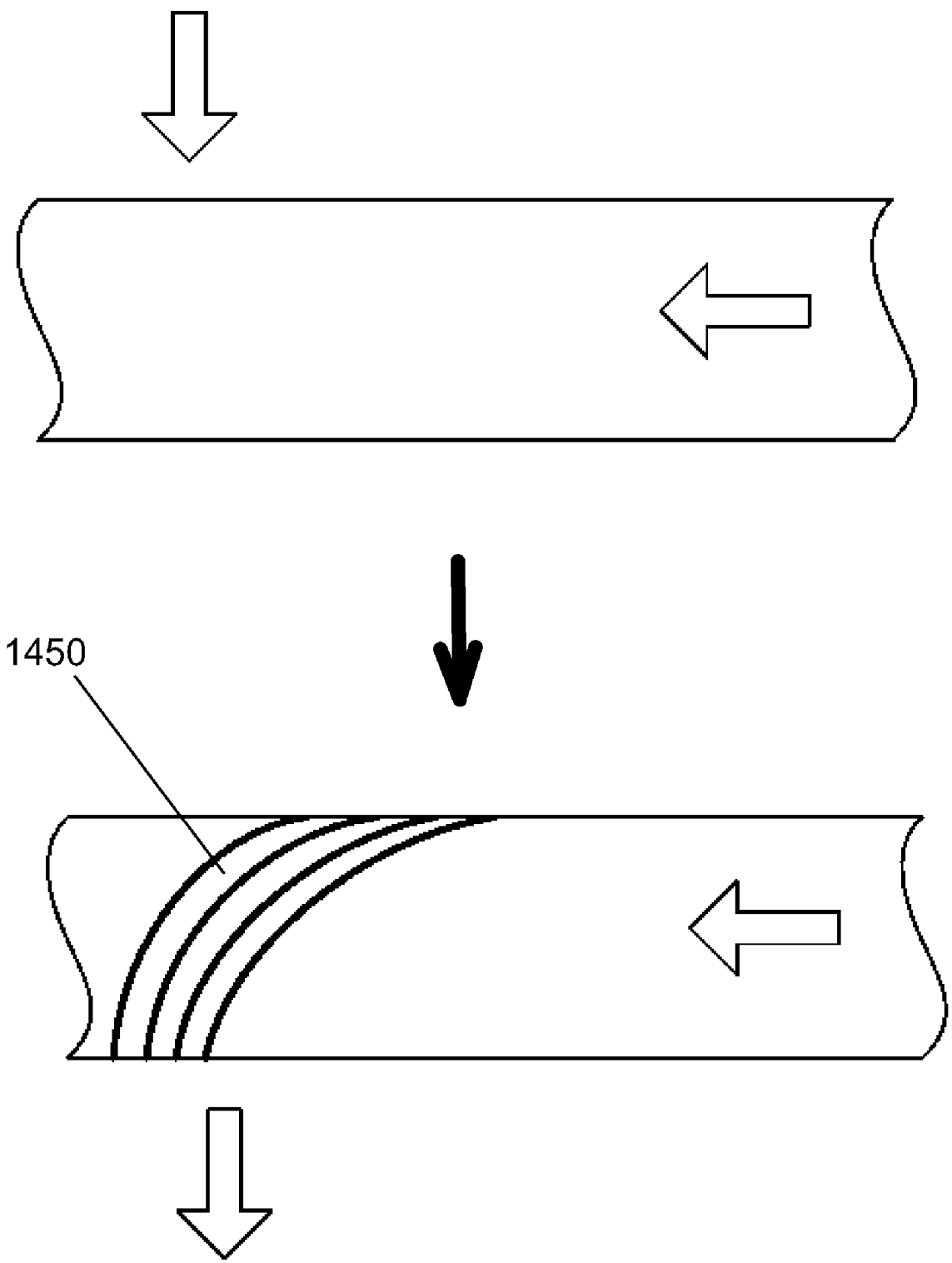

Electronic chips may comprise multiple electronic layers. If one or more layers are at least partially transparent at the relevant wavelength(s), then the transmitters or receivers need not be located at the boundary with the photonic transport layer, but may be located within the electronic layers. This could be the case, for example, for silicon-based electronic layers and a transmitter wavelength of 1500 nm. The transmitters or receivers could also be coupled to the photonic transport layer using optical fibers, waveguides, free-space optics, grating coupler, prism coupler, mirrors, or other suitable means known in the art. Some examples of such couplers are shown in FIGS. 14C and 14D. As an example, a one-dimensional second-order grating coupler 1430 and methods for optimizing such couplers are known in the art. An optical coupler may comprise a tilted waveguide facet 1440 for internal reflection. An out-of-plane coupler may be also produced in a photo-refractive medium utilizing interference of real optical beams to generate the diffractive element set 1450 (FIG. 14E).

In addition to the above-mentioned couplers, arbitrary curved couplers may be provided in the photonics transport layer within the scope of the present disclosure. The shape of the in-plane holographic contours may be designed using the principles of computer holographic design described herein while thickness and width of the contours optimizing the efficiency may be optimized using computational methods developed in the context of linear grating couplers, see for example D. Taillaert et al "Out-of-plane grating coupler for efficient butt-coupling between compact planar waveguides and single-mode fibers" IEEE J. Quantum Electron., vol. 38, No. 7, July 2002 and references therein, G. W. Taylor and C Kwan "Determination of diffraction efficiency for a second-order corrugated waveguide", IEEE J. Quantum Electron., vol. 33, No. 2, February 1997 and references therein.

In the previous examples, diffractive element sets were derived from the interferogram phase function only, with the intensity function set to unity or otherwise neglected. Use of other interferogram intensity functions is possible and may be desirable in certain scenarios. For example, it may be useful to employ as the intensity function of the interferogram the magnitude of the electric field of one of the generating fields. In the exemplary embodiment schematically illustrated in FIGS. 16A-16B, the simulated input field 1602 is plane-wave-like, with the input electric field amplitude varying little in the transverse dimension over distances comparable to the transverse extent of the simulated design output field. The simulated output field 1604 has substantially smaller transverse spatial extent than the plane-wave-like input field and, in this example, a field distribution that varies substantially across the output wave front (e.g., a gaussian modal profile, for example). If a simulated plane-wave-like field is used for designing the diffractive element set, and if a plane-wave-like optical field is the input to the resulting device, then in order to generate a device output field having the same spatial properties as the simulated output beam, the diffractive strength or reflectivity of the diffractive elements 1606 must vary in proportion to the simulated output field magnitude. In other words, the diffractive element set 1606 must be spatially apodized according to the magnitude of the simulated output field. The apodization of diffractive strength in the diffractive element set may be realized by any suitable method, including those disclosed in the references incorporated herein.

Figure 17A:
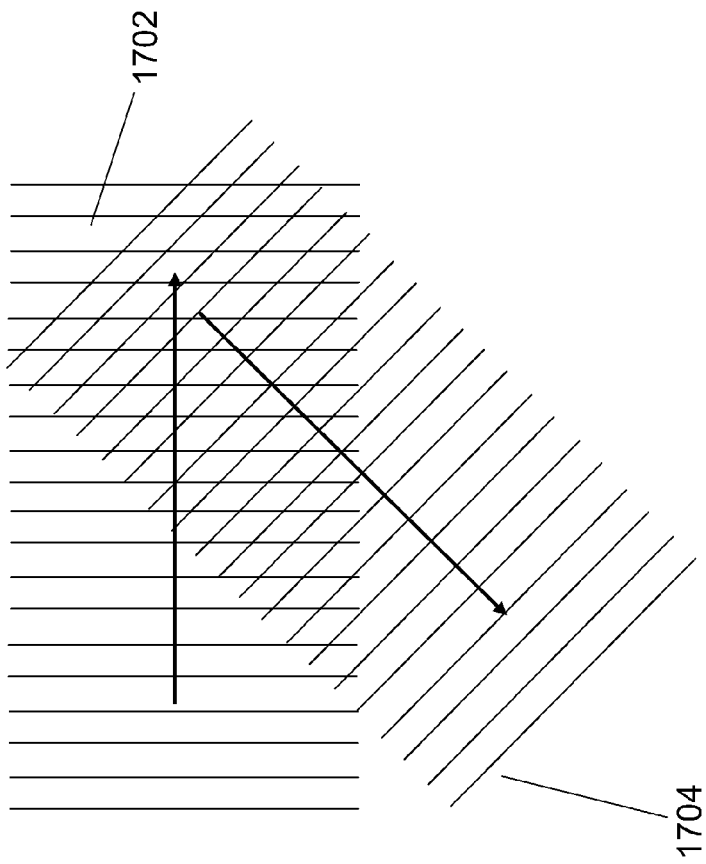
FIG. 17A illustrates schematically simulated design input and output optical signal beams.
Figure 17B:
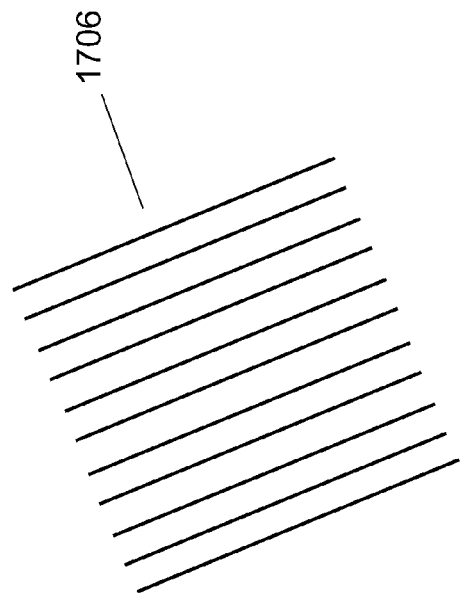
FIG. 17B illustrates schematically the resulting interference pattern.
Figure 17C:
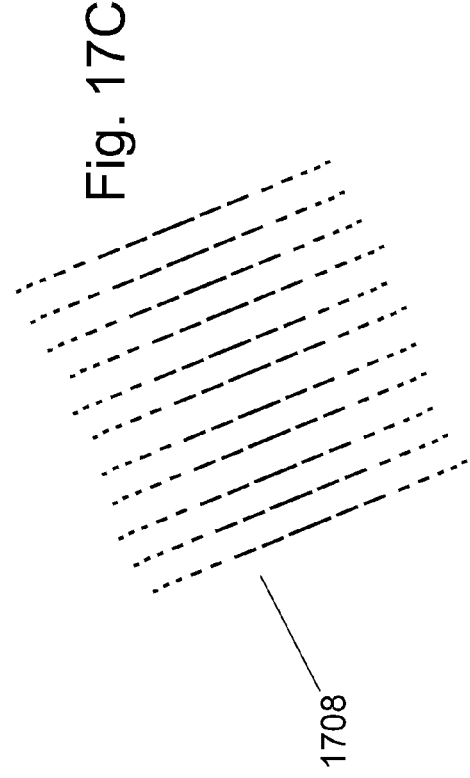
FIG. 17C illustrates schematically a diffractive element set based on the interferogram.

Another exemplary embodiment is schematically depicted in FIGS. 17A-17C, wherein an interferogram intensity function different from unity is employed. In this example, the simulated design input and output fields 1702 and 1704 are both plane waves, so that the equal phase contours 1706 are straight lines. It is possible to affect and shape the device output field of the diffractive element set 1708 by employing an interferogram intensity function different from unity. For example, each diffractive contour may be apodized using a Gaussian function for the diffractive strength with a certain waist. For a sufficiently thin device, the device output field when generated with a plane-wave-like input field will then approximately exhibit the wavefront evolution of a Gaussian field whose minimum waist is located in the center of the diffractive element set 1708. In the specific embodiment of FIG. 17C, partial contour scribing is employed to apodize the diffractive contours as disclosed in various of the incorporated references. The reflective strength of each diffractive contour follows a Gaussian function when measured as a function of position along the contour line and averaged over a suitable spatial distance. To avoid undesirable coherent scattering effects due to regular arrangement of the partially scribed diffractive contours, the fill pattern for each line may be slightly changed or slightly shifted, or the diffractive element may be otherwise adapted, as disclosed in various of the incorporated references.

The exemplary embodiments and design methods disclosed thus far would typically employ monochromatic continuous-wave simulated generating optical fields. Referring back to Eqs. 1 and 2, this is equivalent to setting $T_1$ and $T_2$ to constants and $\omega_1 = \omega_2$ before computing the interference pattern. The use of monochromatic continuous-wave generating fields typically yields a diffractive element set with a spectral response that is, for weakly reflecting structures and unity interferogram intensity function, sinc-function-like with a unique central resonance wavelength and a bandpass whose width is determined by the maximum path length difference that light experiences when traveling from the input port to the output port, or the spatial coherence length of the diffractive elements, whichever is less. A diffractive element set may instead be designed based on an interferogram computed from simulated design input and/or output fields that are pulsed, in other words, with time-dependent $T_1$ and $T_2$ (but retaining $\omega_1 \cong \omega_2$). In addition to summing the fields and computing the squared magnitude to calculate the interference pattern as in the continuous-wave case, an integral over time must also be performed when the temporal envelope functions are not constant. By analogy with Eq. 2, the first two terms of the interference pattern are typically (but not always) discarded, and the third term is retained as the interferogram. The phase function of the interferogram is similar to that of the continuous-wave case, but the interferogram intensity function includes the temporal envelope functions, which must be arranged to overlap in time at the intended location of the diffractive element set. Use of pulsed, and therefore non-monochromatic, simulated design fields allows the design of an arbitrary phase-coherent spectral transfer function for a diffractive element set while at the same time enabling all the beam mapping and/or spatial wavefront processing capabilities of a diffractive element set based on an interferogram generated with simulated cw-beams. Complex spectral transfer functions can also be realized by creating diffractive element sets based on Fourier summation of many constituent diffractive element sets each of which is designed using monochromatic simulated design fields. Each monochromatic diffractive element set is summed over with a Fourier amplitude and phase appropriate for a desired overall complex spectral transfer function.

Figure 18:
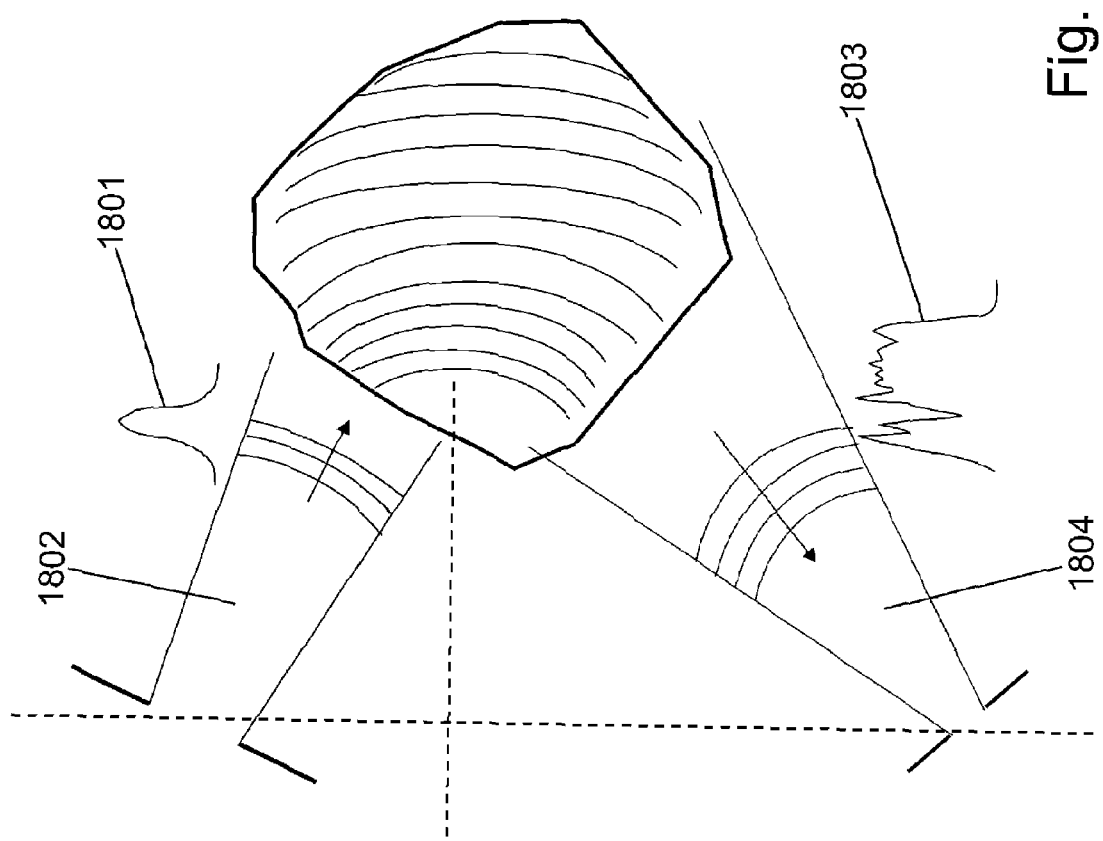
FIG. 18 illustrates schematically simulated design input and output optical signal beams and the resulting interference pattern.

FIG. 18 schematically illustrates an example of the approach to designing diffractive element sets using time-dependent simulated design beams. For design generation, a simulated pulsed design input field 1802 propagates from the location of the design input port. The simulated pulsed design input field may be a spatial eigenmode of a wave guide or optical fiber from which it is launched into the device, with spatial wave front properties at the input port defined accordingly. Or the simulated pulsed design input may instead exhibit any other desired spatial properties. A simulated pulsed design output field 1804 propagates to the design output port, with spatial wave front properties optimized for coupling into an output optical waveguide or optical fiber, or with any other desired spatial properties. A desired spectral transfer function for the diffractive element set is chosen and Fourier-transformed into the time domain. The resulting temporal function 1803 is used as a temporal envelope function (i.e., temporal wave form or temporal pulse shape) for the simulated design output field. The simulated design input pulse temporal envelope 1801 is Fourier-transform-limited and short enough to exhibit spectral bandwidth substantially exceeding that of the desired spectral transfer function, for example by a factor of two to ten. The resulting interferogram 1806 may be used to generate the desired diffractive element set.

Certain constraints exist between the device spectral transfer function and the associated diffractive element set. First, the smallest spectral feature $\Delta v$ of the designed spectral transfer function is related to the maximal optical path difference L within the diffractive element set by $\Delta v \approx c/(2 n_{mod} L)$, where $n_{mod}$ is the modal refractive index of the planar waveguide. When designing spectral features of a certain spectral width, the diffractive element set must have a sufficiently long path difference L, which in turn requires that the simulated generating fields overlap over the distance L. The spatial extent of the overlap may be determined by using simulated design fields that have the same spatial properties as the pulsed simulated design fields but are continuous-wave. Once a spectral transfer function has been chosen whose smallest spectral features are consistent with the spatial extent of the computed continuous-wave interferogram, an interferogram of the simulated pulsed fields may be computed as follows: The input and output simulated pulsed design fields are computationally launched at times such that the simulated design input field overlaps with the leading edge of the temporal envelope of the simulated design output field at the designed input end of the diffractive element set. At each location within the spatial extent of the diffractive element set the interferogram is computed as the short simulated design input field passes through the simulated output field. Note that the evolution of the full output field (carrier frequency and pulse envelope) is followed through this simulated propagation. The carrier frequency of the output field is determined by choosing the desired spectral transfer function (which is then Fourier transformed). An approximately matching carrier frequency (center frequency) should be used for the simulated design input field. Due to the spatial shape (wave front properties) of the simulated design fields the interferogram will have a position-dependent intensity function, which may be used or disregarded as needed or desired for achieving the desired spatial transformation properties for the diffractive element set. These spatial properties may be manipulated in any of the ways disclosed herein for continuous optical signals. It is further possible to design diffractive element sets of desired complex spectral transfer function utilizing a temporally brief simulated design output field or with both simulated design beams having temporal structure.

Figure 19:
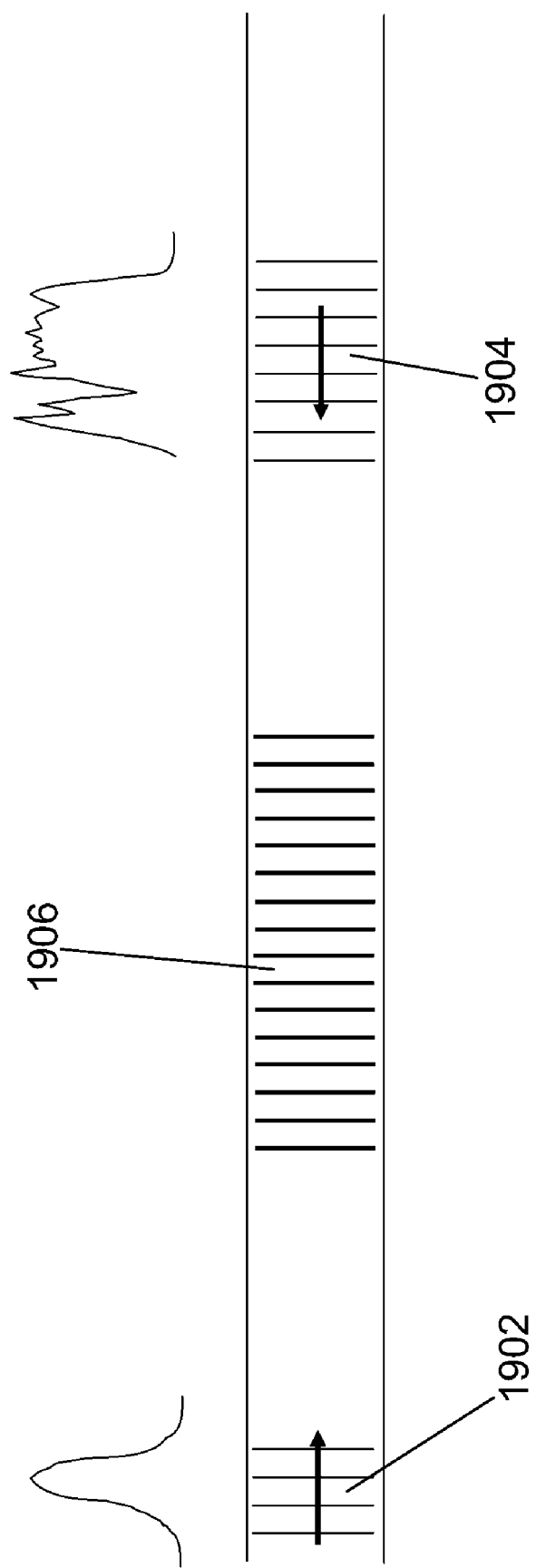
FIG. 19 illustrates schematically simulated design input and output optical signal beams and the resulting interference pattern.

Design of a diffractive element set having a desired spectral transfer function using simulated pulsed design fields may be applied to channel waveguides or optical fibers as well as slab waveguides. As schematically illustrated in FIG. 19, a temporally short simulated design input field 1902 and a temporally longer simulated design output field 1904 are typically spatial eigenmodes of the channel waveguide, and are used to compute interferogram 1906, which is in turn used to fabricate the diffractive element set in the channel waveguide. In addition to confined spatial modes of slab or channel waveguides, free-space modes or unconfined (lossy) modes may be employed in calculating the interferogram function and then fabricate a corresponding diffractive element set. The former may be used for coupling of propagating confined modes to free-space, while the latter allows tailored introduction of loss to cladding modes. The translation of the interferogram amplitude function to the diffractive strength distribution may be realized by apodization methods disclosed in the references.

In the exemplary embodiments disclosed herein, specific dimensions and materials have been recited. It should be understood that use of such dimensions and materials is for illustrative purposes only and should not be construed as limiting the scope of the present disclosure or appended claims. Within the scope of the present disclosure or appended claims, a wide range of materials (including but not limited to polymers, plastics, various glasses, and semiconductor materials) may be employed for forming single-mode or multi-mode planar waveguides with various layer thickness or topologies. It should also be understood that the structure of diffractive elements in the exemplary embodiments is for illustrative purposes only, and that sets of diffractive elements of various topologies formed in any layer or layers of the slab waveguide using any appropriate fabrication processes shall fall within the scope of the present disclosure or appended claims. Suitable fabrication processes for forming a planar waveguide or diffractive element sets thereof may include, but are not limited to, stamping, ion exchange, lithographic scribing, injection molding, embossing, flame hydrolysis deposition, laser evaporation deposition, spin-coating, injection molding, roll-pressing, UV-curing, laser or proton beam direct writing, or stamping, depending on the nature of the materials used to form the planar waveguide.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the FIGS. The numbers of diffractive elements may be reduced in some FIGS. for clarity. It should be further noted that the embodiments shown in the FIGS. are exemplary only, and should not be construed as specifically limiting the scope of the written description or the claims set forth herein. It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. An optical apparatus comprising:
    a planar optical waveguide arranged so as to substantially confine in at least one transverse spatial dimension optical signals propagating therein; and
    at least one set of diffractive elements formed in or on the planar optical waveguide and collectively arranged in or on the planar optical waveguide so as to exhibit a positional variation in diffractive amplitude, optical separation, or spatial phase over some portion of the set,
    wherein:
    the diffractive element set is collectively arranged in or on the planar optical waveguide so as to route, as an output optical signal, between corresponding input and output optical ports, a corresponding diffracted portion of an input optical signal that is diffracted by the diffractive element set;
    the diffractive element set is collectively arranged in or on the planar optical waveguide so that the input optical signal or the output optical signal is successively incident on the diffractive elements of the set; and
    the diffractive elements of the set are arranged in or on the planar optical waveguide according to an interference pattern derived from computed interference between a simulated design input optical signal and a simulated design output optical signal, the interference pattern exhibiting said positional variation.

2. The apparatus of claim 1 wherein the diffractive elements are curvilinear diffractive elements.

3. The apparatus of claim 1 wherein the diffractive element set is collectively arranged in or on the planar optical waveguide (i) so that a spatial wavefront of the input optical signal differs in shape from a spatial wavefront of the output optical signal and (ii) an output optical spectrum comprises an input optical spectrum multiplied by a transfer function collectively applied to the input optical signal by the diffractive element set to produce the output optical signal.

4. The apparatus of claim 1 wherein the planar optical waveguide comprises a slab waveguide, and the diffractive element set is collectively arranged in or on the planar optical waveguide so that the input and output optical ports are spatially separated.

5. The apparatus of claim 4 wherein the input and output optical ports are positioned relative to the diffractive element set so that respective propagation directions of the input and output optical signals are separated by a beam crossing angle greater than about 30°.

6. The apparatus of claim 4 wherein the input and output optical ports are positioned relative to the diffractive element set so that respective propagation directions of the input and output optical signals are separated by a beam crossing angle greater than about 60°.

7. The apparatus of claim 4 wherein the input and output optical ports are positioned relative to the diffractive element set so that respective propagation directions of the input and output optical signals are separated by a beam crossing angle greater than about 150°.

8. The apparatus of claim 7 wherein the diffractive element set is collectively arranged in the planar optical waveguide so as to split the input optical signal into multiple output optical signals.

9. The apparatus of claim 7 wherein the diffractive element set comprises means for splitting the input optical signal into multiple output optical signals.

10. The apparatus of claim 7 further comprising a second set of diffractive elements, wherein the diffractive element sets are collectively arranged in the planar optical waveguide so as to split an input optical signal into multiple output optical signals.

11. The apparatus of claim 7 further comprising a second set of diffractive elements, wherein the diffractive element sets comprise means for splitting an input optical signal into multiple output optical signals.

12. The apparatus of claim 1 wherein diffractive elements are collectively arranged in or on the planar optical waveguide so that a second diffracted portion of the input optical signal is routed between the input optical port and a second output optical port, or so that a diffracted portion of a second input optical signal is routed between a second input optical port and the output optical port.

13. The apparatus of claim 12 further comprising a second diffractive element set collectively arranged in or on the planar optical waveguide so as to route the second diffracted portion of the input optical signal or the diffracted portion of the second input optical signal, wherein:
    the diffractive elements of the second diffractive element set are arranged in or on the planar optical waveguide according to an interference pattern derived from computed interference between a simulated design input optical signal and a simulated design output optical signal; and
    the diffractive element sets are overlaid in or on the planar optical waveguide.

14. The apparatus of claim 12 wherein:
    the diffractive element set is collectively arranged in or on the planar optical waveguide so as to route the second diffracted portion of the input optical signal or the diffracted portion of the second input optical signal; and the diffractive element set is collectively arranged in or on the planar optical waveguide according to an interference pattern derived from computed interference between the simulated design input optical signal, the simulated design output optical signal, and a second simulated design input optical signal or a second simulated design output optical signal.

15. The apparatus of claim 1 wherein the diffractive element set is collectively arranged in or on the planar optical waveguide according to a phase function of an interferogram of the interference pattern.

16. The apparatus of claim 15 wherein the diffractive element set is collectively arranged in or on the planar optical waveguide according to the phase function of the interferogram and a spatially-invariant intensity function thereof.

17. The apparatus of claim 15 wherein each element of the diffractive element set is arranged in or on the planar optical waveguide with respect to a constant-phase-difference contour of the phase function of the interferogram.

18. The apparatus of claim 17 wherein elements of the diffractive element set comprise a binary refractive index modulation.

19. The apparatus of claim 17 wherein elements of the diffractive element set comprise more than two levels of refractive index modulation.

20. The apparatus of claim 17 wherein elements of the diffractive element set comprise a partially reflective boundary.

21. The apparatus of claim 15 wherein the diffractive element set is collectively arranged in or on the planar optical waveguide according to both the phase function of the interferogram and a spatially-varying intensity function thereof.

22. The apparatus of claim 21 wherein the intensity function is proportional to a magnitude of the simulated design input optical signal, to a magnitude of the simulated design output optical signal, or to a product of the magnitudes of the design input and output optical signals.

23. The apparatus of claim 21 wherein the intensity function is chosen to yield a desired spatial transformation upon routing the diffracted portion of the input optical signal between the input optical port and the output optical port.

24. The apparatus of claim 21 wherein the amplitude function is chosen to yield a desired spectral or temporal transformation upon routing the diffracted portion of the input optical signal between the input optical port and the output optical port.

25. The apparatus of claim 1 wherein each of the simulated design input optical signal and the simulated design output optical signal comprises a continuous-wave optical signal.

26. The apparatus of claim 1 wherein the simulated design input optical signal comprises a substantially transform-limited optical pulse, and the simulated design output optical signal comprises a Fourier transform of a desired spectral transfer function.

27. The apparatus of claim 26 wherein the planar optical waveguide comprises a channel waveguide.

28. The apparatus of claim 1 wherein the simulated design input optical signal emanates from a mechanism coupling an out-of-plane optical signal to the interior of a slab waveguide, and the simulated design output signal converges onto a mechanism coupling in-plane optical signals out of the slab waveguide.

29. An optical apparatus comprising:
a planar optical waveguide arranged so as to substantially confine in at least one transverse spatial dimension optical signals propagating therein; and
diffractive means for routing, as an output optical signal, between corresponding input and output optical ports, a corresponding diffracted portion of an input optical signal that is diffracted by the diffractive element set;
wherein:
the diffractive means comprises at least one set of diffractive elements formed in or on the planar optical waveguide and collectively arranged so as to exhibit a positional variation in diffractive amplitude, optical separation, or spatial phase over some portion of the set,
the diffractive element set is collectively arranged in or on the planar optical waveguide so that the input optical signal or the output optical signal is successively incident on the diffractive elements of the set; and
the diffractive elements of the set are arranged in or on the planar optical waveguide according to an interference pattern derived from computed interference between a simulated design input optical signal and a simulated design output optical signal, the interference pattern exhibiting said positional variation.

30. The apparatus of claim 29 wherein the diffractive elements are curvilinear diffractive elements.

31. The apparatus of claim 29 wherein the diffractive element set is collectively arranged in or on the planar optical waveguide (i) so that a spatial wavefront of the input optical signal differs in shape from a spatial wavefront of the output optical signal and (ii) an output optical spectrum comprises an input optical spectrum multiplied by a transfer function collectively applied to the input optical signal by the diffractive element set to produce the output optical signal.

* * * * *